US012582263B2

(12) United States Patent
Annumalla et al.

(10) Patent No.: US 12,582,263 B2
(45) Date of Patent: Mar. 24, 2026

(54) ROASTING SYSTEM WITH AN AGITATOR

(71) Applicant: INTELLIGENT BEAN CO., Seattle, WA (US)

(72) Inventors: Anjaniprasad Nageshrao Annumalla, Seattle, WA (US); Colin Jacob Miller, Seattle, WA (US); Barrett Estep Krueger, Seattle, WA (US); David Barnes Yancey, Seattle, WA (US); Timothy Mark Christman, Seattle, WA (US); Patrick Timothy Russo, Seattle, WA (US); Justin Matthew Knowles, Seattle, WA (US)

(73) Assignee: Intelligent Bean Co., Seattle, WA (US)

( * ) Notice: Subject to any disclaimer, the term of this patent is extended or adjusted under 35 U.S.C. 154(b) by 0 days.

(21) Appl. No.: 19/046,227

(22) Filed: Feb. 5, 2025

(65) Prior Publication Data

US 2025/0176760 A1 Jun. 5, 2025

Related U.S. Application Data

(63) Continuation of application No. PCT/US2023/029664, filed on Aug. 7, 2023.
(Continued)

(51) Int. Cl.
*A47J 37/06* (2006.01)
*A23F 5/04* (2006.01)
(Continued)

(52) U.S. Cl.
CPC ............. *A47J 37/0641* (2013.01); *A23F 5/04* (2013.01); *A23F 5/10* (2013.01); *A23N 12/08* (2013.01);
(Continued)

(58) Field of Classification Search
CPC .... A47J 37/0641; A47J 36/32; A47J 37/0664; A47J 31/42; A23F 5/04; A23F 5/10;
(Continued)

(56) References Cited

U.S. PATENT DOCUMENTS 4,196,342 A 4/1980 Chailloux
4,494,314 A 1/1985 Gell, Jr.
(Continued)

FOREIGN PATENT DOCUMENTS

CN 110497551 A 11/2019
WO 03011050 A1 2/2003
(Continued)

OTHER PUBLICATIONS

Aillio, "Bullet Roaster R1 V2 (Includes IBTS + Chaff Filter + ToolKit)," Sep. 2020, URL=https://aillio.com/?product=bullet-roaster-r1, download date Aug. 22, 2022, 2 pages.
(Continued)

*Primary Examiner* — Elizabeth M Kerr
*Assistant Examiner* — Keith Brian Assante
(74) *Attorney, Agent, or Firm* — Seed Intellectual Property Law Group LLP

(57) ABSTRACT

A roasting system is provided in a form factor of a countertop roasting device including a blower and a roasting assembly in fluid communication with the blower. The roasting assembly receives air from the blower with a heating element of the roasting assembly producing a heated air stream fed through the roasting assembly. An agitator in the roasting assembly agitates the food product. A food product is received in a container of the roasting assembly, with the heated air stream roasting the food product. The system includes a plurality of sensors and a controller that adjusts operating characteristics of the system based on whether a shell of the food product has cracked during
(Continued)

roasting, as determined with the microphone. A waste product from the food product is separated during roasting and collected in a waste collection assembly with a spray bar assisting with smoke suppression.

11 Claims, 13 Drawing Sheets

Related U.S. Application Data

(60) Provisional application No. 63/396,184, filed on Aug. 8, 2022.

(51) Int. Cl.

| | |
|---|---|
| *A23F 5/10* | (2006.01) |
| *A23N 12/08* | (2006.01) |
| *A23N 12/12* | (2006.01) |
| *A47J 31/42* | (2006.01) |
| *A47J 36/32* | (2006.01) |
| *B01F 27/112* | (2022.01) |
| *B01F 27/808* | (2022.01) |
| *B01F 27/90* | (2022.01) |
| *B01F 101/00* | (2022.01) |
| *B01F 101/09* | (2022.01) |

(52) U.S. Cl.
CPC ......... *A23N 12/083* (2013.01); *A23N 12/125* (2013.01); *A47J 36/32* (2013.01); *A47J 37/0664* (2013.01); *B01F 27/112* (2022.01); *B01F 27/808* (2022.01); *B01F 27/90* (2022.01); *A47J 31/42* (2013.01); *B01F 2101/09* (2022.01); *B01F 2101/1805* (2022.01)

(58) Field of Classification Search
CPC .... A23N 12/08; A23N 12/083; A23N 12/125; B01F 27/112; B01F 27/808; B01F 27/90; B01F 2101/09; B01F 2101/1805
See application file for complete search history.

(56) References Cited

U.S. PATENT DOCUMENTS

| | | | |
|---|---|---|---|
| 4,687,909 A | | 8/1987 | Eichler et al. |
| 4,691,447 A | * | 9/1987 | Nakai ................... A23N 12/10 |
| | | | 34/267 |
| 4,698,916 A | | 10/1987 | Farber |
| 5,016,362 A | | 5/1991 | Nakamura et al. |
| 5,359,788 A | | 11/1994 | Gell, Jr. |
| 5,564,331 A | | 10/1996 | Song |
| 5,749,288 A | | 5/1998 | Skaling |
| 5,958,494 A | * | 9/1999 | Tidland ................ A23N 12/083 |
| | | | 426/523 |
| 6,173,506 B1 | | 1/2001 | Kruepke et al. |
| 6,260,479 B1 | | 7/2001 | Friedrich et al. |
| 6,382,087 B1 | | 5/2002 | Iiyama |
| 9,545,169 B2 | | 1/2017 | Stordy et al. |
| 9,706,873 B2 | | 7/2017 | Anthony et al. |
| D802,611 S | | 11/2017 | Mangold et al. |
| D808,994 S | | 1/2018 | Mangold et al. |
| 10,028,615 B2 | | 7/2018 | Anthony et al. |
| 10,463,192 B2 | | 11/2019 | Anthony et al. |
| D883,733 S | | 5/2020 | Simonsen |
| 10,959,575 B2 | | 3/2021 | McCullough et al. |
| 11,051,649 B2 | | 7/2021 | Anthony et al. |
| 11,259,668 B2 | | 3/2022 | Yildizli |

| | | | |
|---|---|---|---|
| 11,284,631 B2 | | 3/2022 | Laux et al. |
| 11,324,237 B2 | | 5/2022 | Shi et al. |
| 11,344,053 B2 | | 5/2022 | Tun et al. |
| 11,375,730 B2 | | 7/2022 | Scolari |
| 11,678,687 B2 | * | 6/2023 | Stordy ................... A23N 12/08 |
| | | | 99/286 |
| 2003/0061942 A1 | | 4/2003 | Erickson et al. |
| 2005/0167371 A1 | | 8/2005 | Perry et al. |
| 2012/0060823 A1 | * | 3/2012 | Armangue Casademont .............. |
| | | | A47J 37/079 |
| | | | 126/25 B |
| 2013/0276637 A1 | * | 10/2013 | Stordy ...................... A23F 5/02 |
| | | | 99/348 |
| 2015/0135966 A1 | * | 5/2015 | Hulett .................. A47J 31/404 |
| | | | 99/289 R |
| 2015/0182070 A1 | * | 7/2015 | Leijenaar .............. F24C 15/107 |
| | | | 220/573.1 |
| 2016/0295906 A1 | | 10/2016 | Jacobsen et al. |
| 2017/0013870 A1 | * | 1/2017 | Hsiao ..................... A23N 12/12 |
| 2018/0295870 A1 | | 10/2018 | Lopez et al. |
| 2019/0142053 A1 | | 5/2019 | Tun et al. |
| 2019/0320702 A1 | | 10/2019 | Sandhu et al. |
| 2019/0320703 A1 | | 10/2019 | Sandhu et al. |
| 2019/0350247 A1 | | 11/2019 | Lopez et al. |
| 2020/0107672 A1 | * | 4/2020 | Cha ...................... A23N 12/083 |
| 2020/0288765 A1 | | 9/2020 | Lopez et al. |
| 2021/0227871 A1 | | 7/2021 | Sandhu et al. |
| 2021/0386108 A1 | | 12/2021 | Lopez et al. |
| 2023/0007975 A1 | | 1/2023 | Annumalla et al. |
| 2023/0104849 A1 | * | 4/2023 | Dubief .................. A23N 12/08 |
| | | | 99/483 |
| 2024/0032559 A1 | * | 2/2024 | Morend ................... B03C 3/12 |
| 2024/0049764 A1 | * | 2/2024 | Morend ................. A23F 5/046 |

FOREIGN PATENT DOCUMENTS

| | | |
|---|---|---|
| WO | 2020113207 A1 | 6/2020 |
| WO | 2021007086 A1 | 1/2021 |
| WO | 2022053522 A1 | 3/2022 |

OTHER PUBLICATIONS

Bellwether Coffee, "Incredible Coffee. Real Impact. Made Simple. The Bellwether Roasting System," Jan. 2016, URL=https://bellwethercoffee.com/, download date Aug. 22, 2022, 3 pages.

Coffee Bean Corral, "Behmor 2000AB Plus," Aug. 10, 2020, URL=https://www.coffeebeancorral.com/product/Behmor-2000AB-Plus-Coffee-Roaster_BEHMOR2000AB.aspx, download date Aug. 22, 2022, 4 pages.

Coffee Bean Corral, "Gene Café Drum Roaster Black," Jun. 2014, URL=https://www.coffeebeancorral.com/GENECAFE-Home-Coffee-Roaster.aspx, download date Aug. 22, 2022, 6 pages.

Hottop Americas, "Hottop Americas," Oct. 2021, URL=https://www.hottopamericas.com/, download date Aug. 22, 2022, 1 page.

Hottop Americas, "Hottop Coffee Roaster Available Models," Oct. 2021 URL=https://www.hottopamericas.com/product.html, download date Aug. 22, 2022, 1 page.

Ikawa Home, "Ikawa Home Roasting System," Nov. 2021, URL=https://ikawahome.com/products/ikawa-home-roasting-system, download date Aug. 22, 2022, 5 pages.

Jiyonson BeanGo Cube, "The Smartest Coffee Roaster," Sep. 2020, URL=https://jiyonson.com/about-beango-cube-/?lang=en, download date Aug. 22, 2022, 3 pages.

Sweet Maria's Home Coffee Roasting, "Fresh Roast SR800," Nov. 2020, URL=https://www.sweetmarias.com/fresh-roast-sr800.html, download date Aug. 22, 2022, 2 pages.

* cited by examiner

ROASTING SYSTEM WITH AN AGITATOR

BACKGROUND

Technical Field

The present disclosure is directed to a compact coffee bean roasting system including an agitator.

Description of the Related Art

The production of coffee generally begins with the harvesting of coffee cherry fruit. The coffee cherry fruit are then dried before being shipped as green coffee beans. The drying process may be performed according to a number of known methods. The green coffee beans are roasted to yield roasted beans suitable for making coffee.

At a high level, the coffee roasting process includes applying heat to the green coffee beans for a specified period of time. Coffee beans are initially covered by a dry skin known as chaff that is removed during the roasting process. While methods of roasting coffee vary, the process can generally be summarized in three steps. The first step is a drying stage to reduce a moisture content of the beans and prepare them for roasting. In some examples, the drying process may be part of the overall roasting process. In other cases, the drying can be done as a separate process ahead of roasting. The second stage is a browning stage, which begins to change the color of the beans from green to yellow while also continuing the drying process. Further, Maillard reactions begin to occur during the browning stage, whereby sugars and amino acids react to create different aroma and color compounds known as melanoids. The coffee beans begin to emit an audible pop near the end of the browning stage, which is also known as the first crack. After the first crack, the process moves to the third and final stage known as the roast development stage. In this stage, the reaction becomes exothermic and the coffee beans again crack (the "second crack") while also developing additional aroma compounds. Further, the coffee beans emit oils during this stage that can further impact the flavor of the coffee.

The first crack is a phenomenon where coffee beans absorb heat to a certain threshold point and then release the absorbed heat, resulting in a cracking sound. Although the "first crack" suggests a singular occurrence, the first crack can include multiple stages, including a beginning of the first crack, which is typically followed by a series of cracks, and then a final or end of the first crack. The entire first crack, from the beginning to the end, is known as the first crack duration. The second crack may be similar with a duration of the second crack being known as the second crack duration.

The coffee roasting process and the flavor of the resulting coffee is highly dependent on when the roasting process is terminated (i.e., before, during, or after the first or second crack), roasting temperature during the various processing stages, the time of each stage, and the quality and characteristics of the green coffee cherry seeds, among other characteristics. In general, producing coffee with a desirable flavor profile is a complex process. As a result, traditional coffee roasting has been limited to commercial applications utilizing expensive equipment such as commercial drum roasters, bed roasters, and cooling systems.

There are inefficiencies and disadvantages with known coffee roasting systems and methods. For example, most coffee is roasted in large batches according to relatively standard temperature and time recipes. Such recipes do not take into account variations in bean characteristics, such as initial humidity level, and can therefore lead to a lack of uniformity and sub-optimal flavor development in the final roasted beans. In addition, if the batch size is not suited to the equipment, the resulting roast will not be uniform. Due to the inherent nature of batch roasting, a significant amount of chaff is produced during the earlier part of roasting, followed by significant amount of smoke towards the end of roasting because all of the beans are moving through the various stages together. Batch roasting is also inefficient for changing coffee demands, as batches of the same size are likely to lead to over production or under production of roasted coffee beans as demand changes. Finally, judgment and expertise are needed to know when and how to adjust a heat source, when and how to adjust airflow, and when to stop a roast during a batch roasting operation. Errors with any of the above can impact the entire batch and increase the likelihood of a substantial waste of coffee for incorrect batches. These same issues are not limited to roasting coffee, but are also implicated in other roasting processes as well, such as with respect to nuts and cocoa, among others.

As a result, it would be advantageous to have roasting systems, devices, and methods that overcome the disadvantages of known roasting systems.

BRIEF SUMMARY

The present disclosure is directed to a counter-top coffee bean roasting system for home or office use. It is a small form factor that includes a roasting chamber and an agitator that is configured to receive green coffee beans and roast the beans to a user selected roasting profile. The system includes a funnel or opening from a top side that allows beans to be poured into a hopper or holding chamber. This holding chamber can include a measuring unit that provides precision measuring of the green coffee beans to allow more precise control of the roast.

There are doors that separate the holding chamber from the roasting chamber. In one embodiment, there are two doors controlled by a servomechanism that open the doors simultaneously after the roasting profile is entered into the system. The doors may have a sliding mechanism or rotating mechanism to release the beans from the holding chamber into the roasting chamber.

The roasting chamber has a plurality of small openings in bottom surface. This bottom surface can also be a mesh or other suitable surface that allows air to be moved from outside the system, into a blower, and into the roasting chamber. The blower may include a heating element, such as a resistive coil or a heating element can be incorporated into another location of the system, before the roasting chamber.

An agitator is centrally coupled in the roasting chamber on the bottom surface. The agitator is configured to rotate about a central point to move and agitate the beans during the roasting process. The hot air and movement of the beans helps to control the roasting process.

The roasting chamber includes a plurality of sensors, such as one or more temperature sensors that provide real time feedback to a central processing unit or controller. The sensors can includes one or more microphones configured to detect the first and second cracks. The microphones are also coupled to the controller for real time detection and response to the first and second cracks. This allows for precise control over the roasting.

The system includes a smoke suppression sub-system that is fluidically coupled to the roasting chamber. Chaff is removed during the roasting process and is collected in a removable chamber.

The present disclosure is generally directed to roasting systems, devices, and methods that may be applicable to consumer scale and commercial roasting applications. In one example, a countertop roasting device includes a blower or fan, a roasting assembly in communication with the blower, an agitator in the roasting assembly, smoke suppression, and a waste collection assembly in communication with the roasting assembly. The roasting assembly includes a container for receiving a food product and a heating element. The blower is operable to output air to the heating element, which heats the air to a heated air stream. The heated air stream is provided to the container of the roasting assembly under pressure from the blower. The food product in the container is agitated by the agitator and roasted by the heated air stream, which may also remove a waste product from the food product. In some examples, the roasting assembly also includes additional heat sources, such as a radiation heat source, conduction heat source, or others. The waste product exits the roasting assembly to the waste collection assembly.

The waste collection assembly may include a cyclonic separator for separating the particulate waste product from the air stream and collecting the same in a collection bin. The collection bin can then be emptied to remove the waste.

The device may further include a microphone, a camera, and other sensors for gauging the roasting process and providing signals to a controller to adjust operating characteristics, such as at least the air speed output by the blower and the heat output by the heating element, in a control loop that adjusts the roasting profile based on the detected qualities of the food product. A user may also be able to select different recipes and roasting profiles through a user interface of the device or on a mobile computing device, or both, with the control loop adjusting the recipe based on the detected parameters. In some examples, the food product is green coffee cherry seeds and the waste product is chaff that results from roasting of the coffee with the above device enabling uniform coffee roasting of green coffee cherry seeds with different characteristics in a countertop appliance.

In yet further examples, the device automatically dispenses the roasted beans into a storage container that is resealable or stores the roasted beans in an airtight space and grinds and dispenses the beans as needed in response to user demand. The device may also be associated with one or more remote computing devices, including but not limited to a mobile device with a mobile application displayed via a graphical user interface on the mobile device for sharing recipes between users as well as creating a digital roast artist platform.

BRIEF DESCRIPTION OF THE SEVERAL VIEWS OF THE DRAWINGS

The present disclosure will be more fully understood by reference to the following figures, which are for illustrative purposes only. These non-limiting and non-exhaustive embodiments are described with reference to the following drawings, wherein like labels refer to like parts throughout the various views unless otherwise specified. The sizes and relative positions of elements in the drawings are not necessarily drawn to scale in some figures. For example, the shapes of various elements are selected, enlarged, and positioned to improve drawing legibility. In other figures, the sizes and relative positions of elements in the drawings are exactly to scale. The particular shapes of the elements as drawn may have been selected for ease of recognition in the drawings. The figures do not describe every aspect of the teachings disclosed herein and do not limit the scope of the claims.

DETAILED DESCRIPTION

Figure 1:
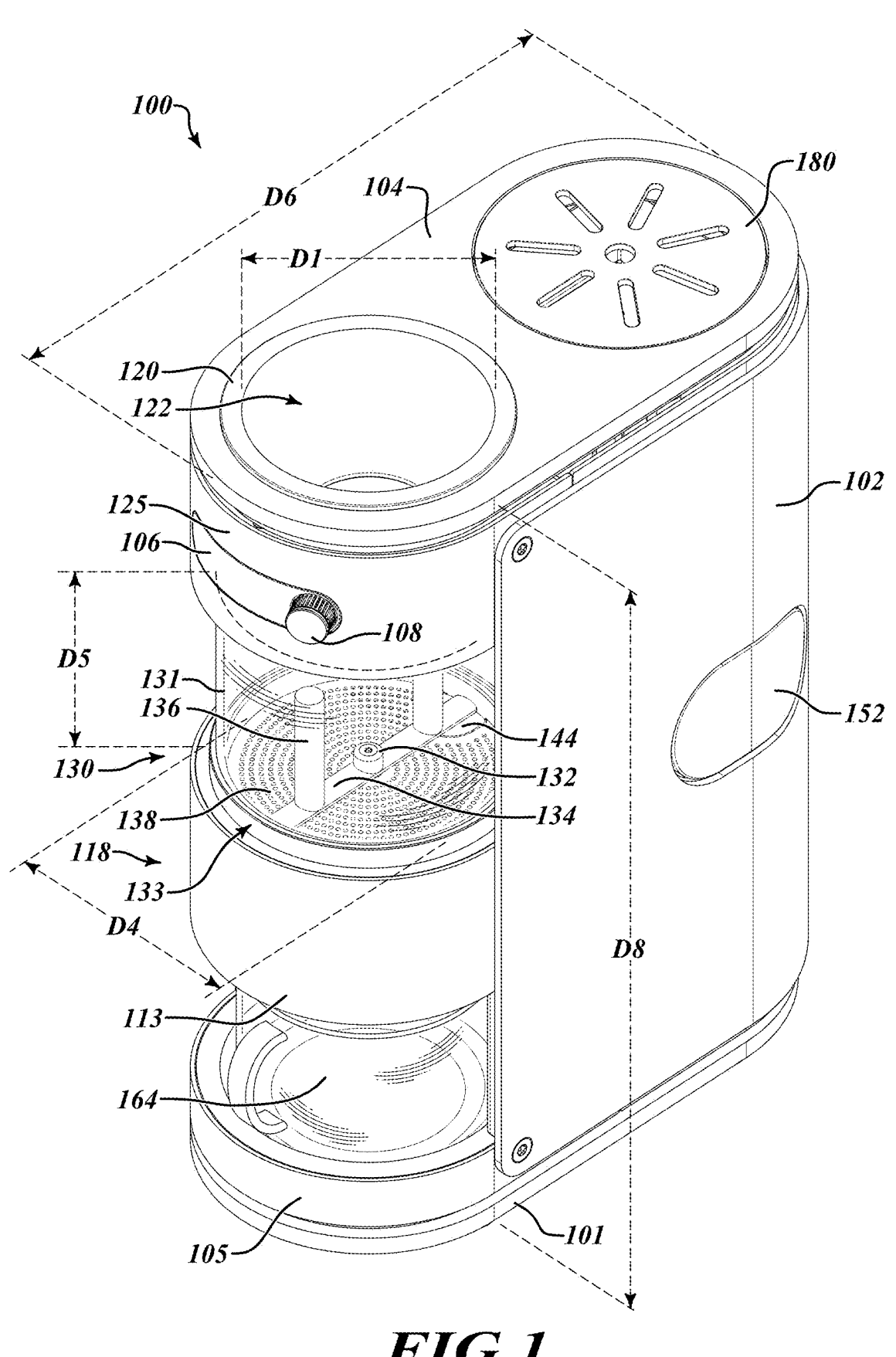
FIG. 1 is a front perspective view of a countertop roasting device.

Persons of ordinary skill in the relevant art will understand that the present disclosure is illustrative only and not in any way limiting. Other embodiments of the presently disclosed systems and methods readily suggest themselves to such skilled persons having the assistance of this disclosure.

Each of the features and teachings disclosed herein can be utilized separately or in conjunction with other features and teachings to provide roasting systems, devices, and methods. Representative examples utilizing many of these additional features and teachings, both separately and in combination, are described in further detail with reference the figures. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components.

Roasting systems, devices, and methods are described herein for roasting a food product and producing a roasted food product implemented in, for example, a form factor of a countertop appliance. In addition, techniques are described for controlling operational characteristics of the roasting systems, devices, and methods based on user input as well as sensors in a feedback control loop. Some or all of the techniques described herein may be performed by automated operations of an embodiment of the roasting devices, systems, and methods, as discussed in greater detail below.

As used herein, the term "user" may refer to any human operator of a device, system, or system described in the present disclosure. The term "selecting," when used herein in relation to one or more elements of a graphical user interface or other electronic display, may include various user actions taken with respect to various input control devices depending on the client computing device used to interact with the display, such as one or more clicks using a mouse or other pointing device, one or more tapping interactions using a touch screen of a client device, etc. In addition, such selecting may additionally comprise interactions with various physical actuators capable of generating electrical or electronic signals as a result of such interactions. A nonexclusive list of examples of such actuators include electronic, mechanical or electromechanical implementations of keys, buttons, pressure plates, paddles, pedals, wheels, triggers, slides, touchpads, or other touch- or motion-sensitive element on the device, and may be digital or analog in nature.

Although the present disclosure will proceed to describe certain embodiments of roasting systems, devices, and methods for roasting coffee cherry seeds, it should be appreciated that the concepts of the disclosure are not limited thereto and can be applied broadly to other roasting applications. For example, the concepts of the disclosure can likewise be applied to other food products and food items, such as least nuts, cocoa, and others. Moreover, the roasting systems, devices, and methods herein can be implemented in a number of different form factors, with the figures merely providing representative examples to illustrate concepts of the disclosure. While a form factor of a countertop appliance is a particularly advantageous embodiment for the concepts of the disclosure, it should be understood that the concepts of the disclosure can be applied equally to commercial roasting applications. In one non-limiting example, the controller described herein and the feedback control loop are particularly well suited to commercial roasting applications, among others.

FIGS. 1-7 are various views of a compact countertop roasting device or system 100 for roasting a food product, like coffee beans. The device 100 includes a base, a top, and a central support frame extending between the base and the top. There is a top cover 104 that includes an opening for a hopper 120 and a smoke suppression system 180.

A user controllable interactive display 180 with a control dial or knob 108 is along a front face of the roasting system. The hopper 120 leads into a roasting chamber 130, which includes a transparent wall to allow the user to observe the beans during roasting. The roasting chamber 130 includes a perforated plate 138 that allows heated air into the roasting chamber 130. The plate 138 includes a plurality of openings through which the air flows into the roasting chamber from a blower or air moving system 190. The blower is positioned in a rear portion of the system, behind an exterior panel or cover 102.

This cover 102 wraps from a first side around the back of the system, to a second side, i.e. from a right to a left side of the system. The cover 102 can be removed to view and access the features that are in the rear portion of the system.

An agitator 158 is positioned on the plate 138 and is configured to spin or turn about a central point 134. The agitator 158 is configured to displace the food product in the roasting chamber 130 during and after a roasting process. Displacing the food product via the agitator helps to achieve an even roast.

The agitator 158 is in the roasting chamber 130 on the perforated disc 138 in FIG. 1. The agitator or rotatable assembly 158 includes a center portion 132 coupled to the rotor drive shaft 182 in FIG. 3. The agitator 158 includes a substantially flat and planar blade 134 having a center portion 132 between a first portion and a second portion. The first and second portions of the blade 134 having substantially equal dimensions.

The agitator 158 includes first and second extensions or arms 136 coupled to the blade 134 that extend into the roasting chamber. The first extension 136 extending transverse from the first portion of the blade 134 and the second extension 136 extending from the second portion of the blade 134. In one embodiment, the first and second extensions are substantially perpendicular or at an angle with respect to the blade 134.

Figure 3:
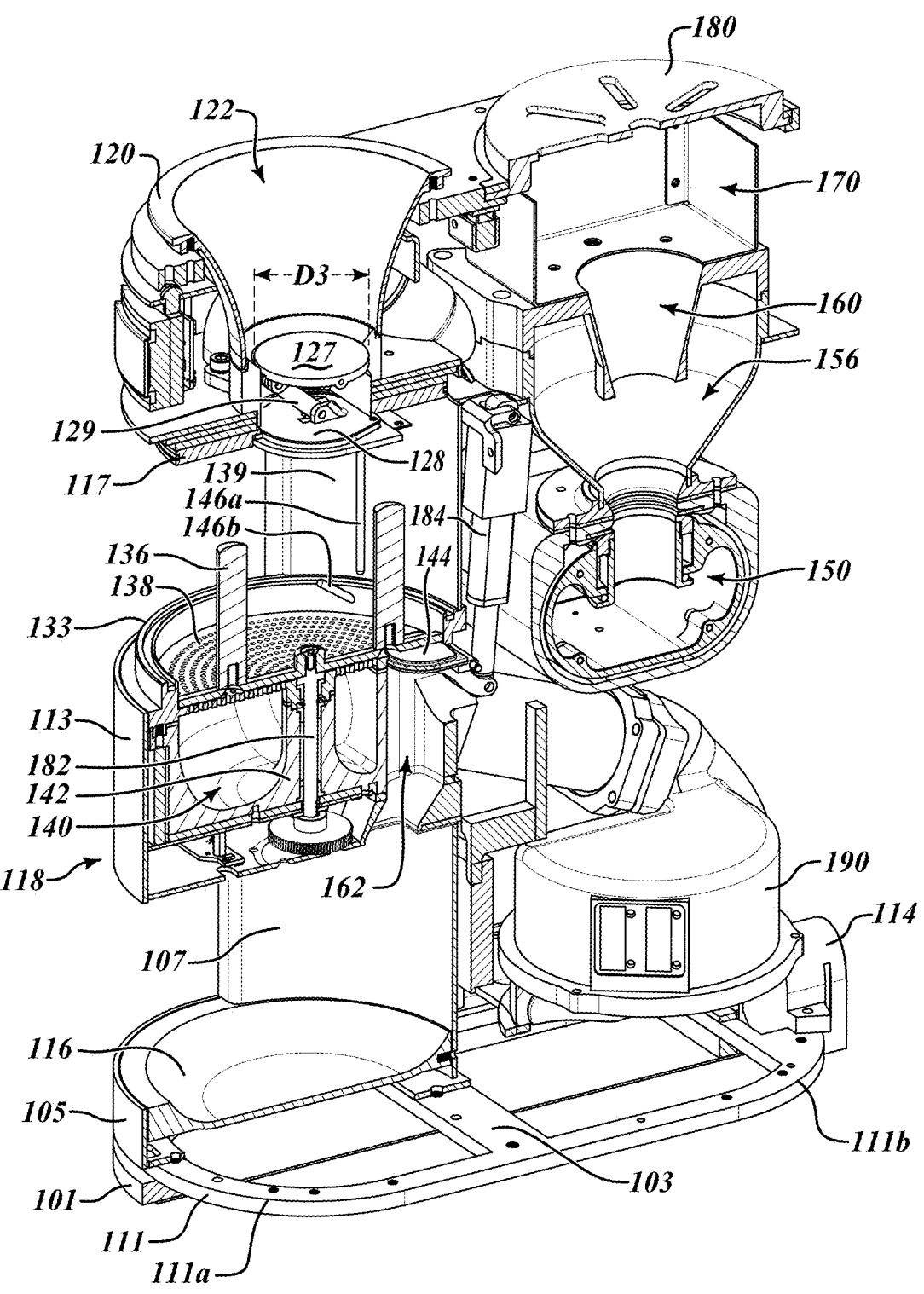
FIG. 3 is a cross-sectional view of the device of FIG. 1.

In FIG. 3, a screw or other suitable fastening mechanism couples the first and second arms 136 to the blade 134. In other embodiments, the first and second arms 136 and the blade 134 are a single integral component. The first and second extensions 136 are equally spaced from respective ends of the blade 134. The first and second extensions 136 are cylindrical. In other embodiments, the first and second extensions 136 have other suitable shapes. The first and second extensions 136 extend in the first direction for a second dimension less than the first dimension D5. The first and second extensions 136 are equally spaced from the center portion 132.

An air circulation chamber 140 is between the plate 138 and a bean container 164. More details of the air circulation chamber 140 can be found in FIG. 6. A door or chute 144 creates an exit for the roasted beans from the roasting chamber to the bean container 164. Other details of the system and the operation are described below.

The hopper or holding chamber 120 and the smoke suppression system 170 are located adjacent to the top and have openings through the top. A blower 190 and a recessed area for housing a container or bean storage receptacle 164 are located adjacent to the base. Between the base and the top is a heating assembly 186, an air circulation chamber 140, a roasting chamber 130, and a waste collection system including a waste container 150.

The system 100 includes a front portion and a rear portion. The front portion includes the hopper 120, an interactive display 106, a clear roasting chamber 130, and the bean container 164. The rear portion includes the smoke suppression system 170, the chaff or waste collection system 150 and the blower. The system is an oval cylindrical shape where the front and the rear portions are each curved toward a center of the device.

The hopper 120 is in fluid communication with an external environment and configured to receive the food product for roasting and delivers the food product to the roasting chamber 130. The hopper 120 includes a hopper region base 117 that is a substantially flat panel having a grooved edge 117a configured to receive a coupling element 117b, such as a rubber ring to securely hold a removable glass wall 131, which is part of the roasting chamber 130. The hopper 120 includes and an opening 122 that is wider at a top than at a bottom, the bottom being closer to the roasting chamber than the top of the system. The bottom end 124 of the opening 122 is sealable with a first door 127. In some embodiments, the hopper region base 117 has a plurality of subpanels or layers coupled together.

Said differently, the hopper or first funnel 120 is in fluid communication with the roasting chamber 130 and the external environment. The hopper 120 has a cone shape with sloping sidewalls that lead to the roasting chamber 130. The hopper 120 has a first end of the opening 122 in fluid communication with the external environment. The opening 122 is adjacent the first cover 104 of the device 100. The opening 122 is circular and has a first diameter D1. Opposite the first end of the hopper 120 is the second, bottom end 124 of the hopper 120, see FIG. 4. The second end 124 is in controllable fluid communication with the roasting chamber 130 through the doors 127, 128. The second end 124 is circular and has a second diameter D2. The first diameter D1 is greater than the second diameter D2. In some embodiments, the second diameter D2 is half or more than half the first diameter D1.

Between the first and second end of the opening are curved walls tapering from the top to the bottom. The walls can be curved inward to create a smooth chute into the roasting chamber. In other embodiments, the hopper 120 has other suitable shapes. The hopper 120 may be made of a conductive material to allow for a pre-heating or warming step. The hopper 120 may be stainless steel or other suitable material.

Figure 4:
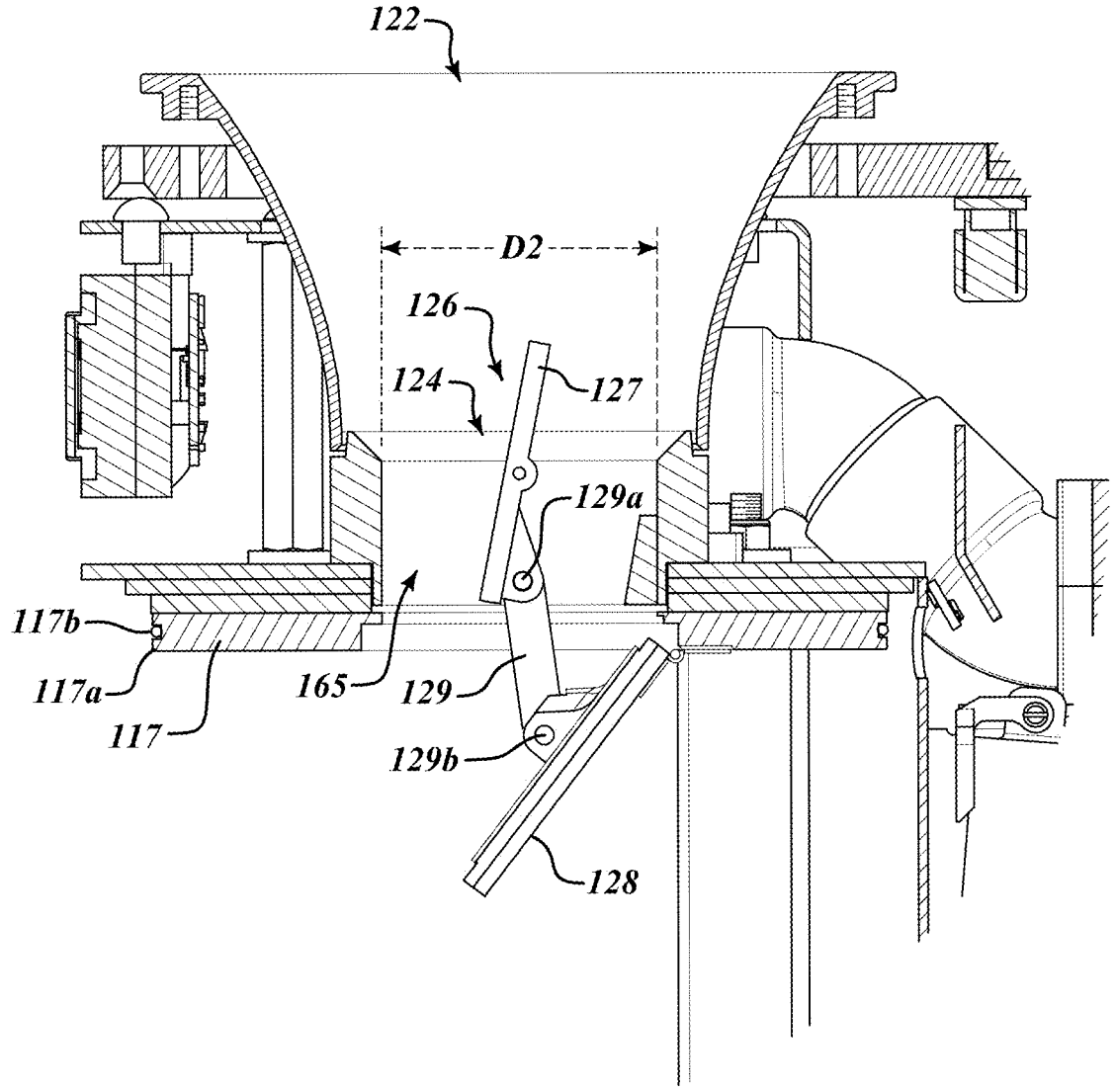
FIG. 4 is an enlarged view of a hopper and door subsystem of the device of FIG. 3.

As in FIG. 4, the device 100 includes a hopper door assembly 126 at the bottom end 124 the hopper 120. The hopper door assembly 126 is configured to seal and unseal a channel between the hopper and the roasting chamber. The hopper door assembly 126 includes a plurality of doors or plates and mechanism 129 configured to open and close the plurality of doors 127, 128. At least one door of the plurality of doors has a circular shape and diameter substantially equal or less than the second diameter D2 of the second end 124. When in the open configuration, the plurality of doors 127, 128 are substantially parallel or otherwise spaced apart from each other in a stacked formation.

One embodiment of the hopper door assembly 126 in a closed configuration is in FIG. 3. The hopper door assembly 126 in an open configuration is in FIG. 4. The hopper door assembly 126 includes first and second plates 127, 128 spaced from each other. The first and second plates 127, 128 have different shapes. The first plate 127 is circular whereas the second plate 128 has a semi-circular shape with a straight or flat edge. The first and second plates 127, 128 each has a substantially flat or planar surface. The flat surface of the first plate 127 is circular with a third diameter D3 substantially equal to or less than the second diameter D2 of the second end 124 of the hopper 120. The second plate 128 has curved edges transverse to a substantially straight edge.

Coupled between the first and second plates 127, 128 is a mechanism or rotatable pivotal connection assembly 129. The connection assembly 129 may be one or two rigid bars having similar dimensions and shape. Each door includes a connection point 129a, 129b on a surface of the door that faces an intermediate channel 165.

The connection assembly 129 is configured to move both first and second plates 127, 128 together into open and closed configurations. The rigid bar is configured to push and pull the first and second plates 127, 128. In FIG. 3, the hopper door assembly 126 is in a closed configuration where the first and second plates 127, 128 extend in the second direction. The first plate 127 extending between and contacting sidewalls of the hopper 120. The second plate 128 being between the first plate 127 and the roasting chamber 130.

In FIG. 4, the hopper door assembly 126 is in an open configuration where the first plate 127 extends in the first direction in the second end 124 of the hopper 120. The first and second plates 127, 128 in this configuration do not seal the second end 124 of the hopper 120. Thus, the external environment is in fluid communication with the roasting chamber 130 via the hopper 120.

The first plate 127 extending to the outer and second ends 122, 124 of the hopper 120. The first plate 127 being coplanar with the sidewalls of the hopper 120. The second plate 128 is coplanar with the first plate 127 and is suspended in the roasting chamber 130.

In one embodiment, the door assembly can be configured to measure or weigh a quantity of the beans. This can be integrated into the first door 127 or in both doors, 127, 128. The door and weighing device can be coupled to a central processing unit that is configured to communicate with the display and other devices in the roasting system to adjust to the user's inputs and roasting profile in real time. For example, the weighing device can display a quantity of weight of the beans in the hopper and the central processing unit can inform the user if the weight or quantity of beans is appropriate or should be adjusted.

Figure 2:
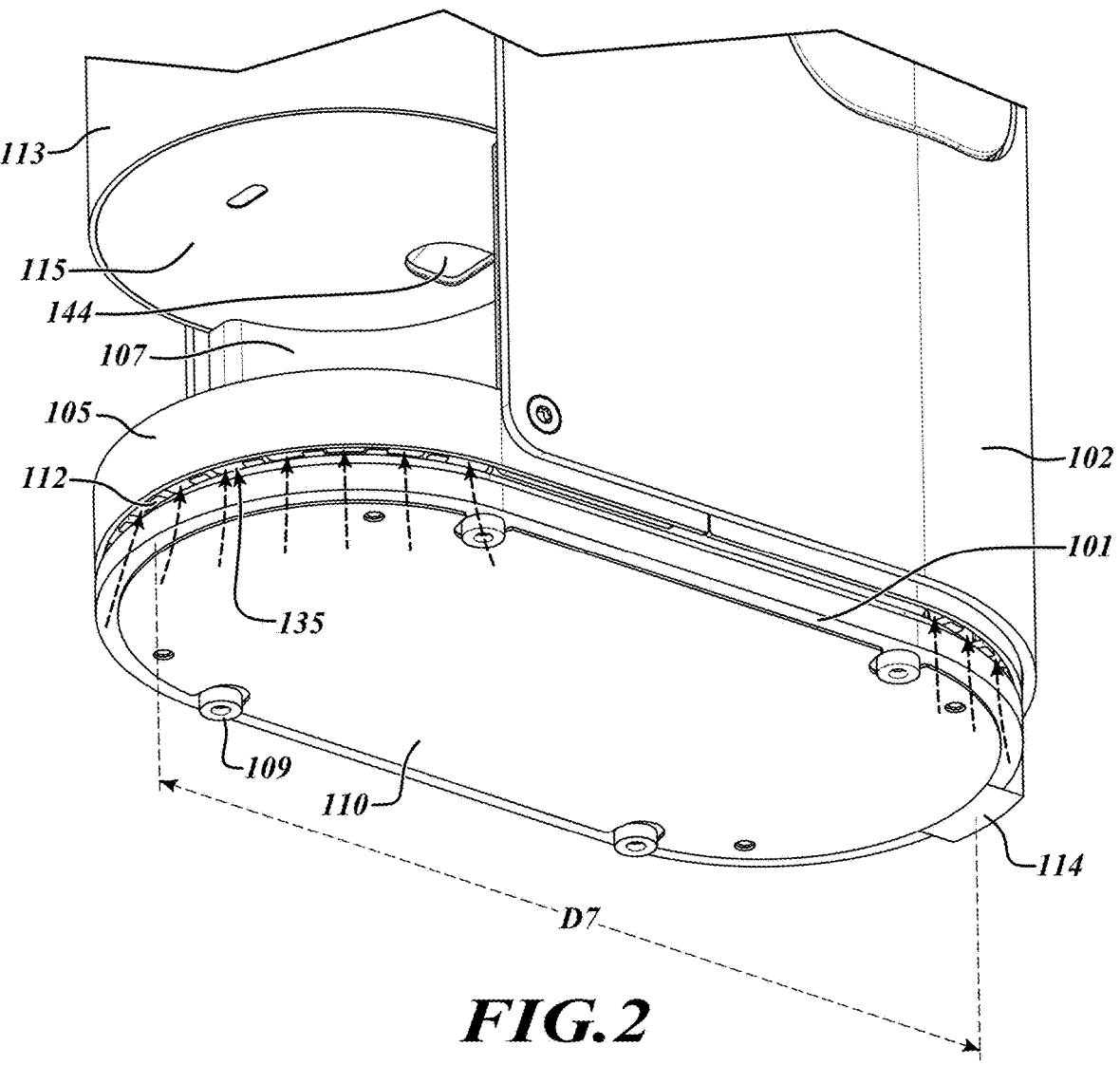
FIG. 2 is a bottom perspective of the device of FIG. 1.

Opposite to the first cover 104 is a second cover 101 on a bottom of the device, which is coupled to an internal frame 111, see FIGS. 2 and 3. The second cover 101 is coupled to the frame via a first plurality of coupling mechanisms, like screws or clips. The frame 111 has a similar shape to the second cover 101. The frame 111 has an outer portion, an inner or beam portion 103 that extends between a left and right side, and a first plurality of openings. The first plurality of openings including a first opening and a second opening spaced from each other by the inner frame portion. The frame 111 extends from a first curved end 111a to an opposite second curved end 111b.

The first and second covers 104, 101 have an oblong shape with straight portions extending between the first and second curved ends. The second cover 101 has a first dimension D6, in FIG. 1, between the first and second curved ends in a second direction transverse to the first direction. The first cover 104 has as a second dimension D7, in FIG. 2, between the first and second curved ends in the second direction. In some embodiments, the first and second dimensions D6, D7 are substantially similar or the same.

The first cover 104 includes a plurality of openings. The hopper 120 extending through a first opening of the plurality of openings and the smoke suppression assembly 170 being in fluid communication with a second opening of the plurality of openings. The second opening having a removable perforated cover 180.

The second cover 101 includes a first plate 110, in FIG. 2, coupled to a first surface of the second cover 101. The first plate has a similar shape to the second cover 101. The first plate has a surface 110 facing the external environment. The first plate has a first plurality of recesses or indentations at an outer edge that are configured to surround a plurality of feet or protrusions 109 of the device 100. Each foot has a substantially flat or planar surface and is spaced apart from each other. Each recess of the plurality of recesses configured to receive a foot of the plurality of feet 109. The plurality of feet 109 are arranged in a manner that allows the device 100 to be stable when placed on an external surface or countertop.

In this embodiment, the first plate is coupled to the second cover 101 via four screws or other suitable coupling mechanisms. In this embodiment, the device 100 has four feet 109 spaced apart and adjacent to the outer edge of the first plate.

In this embodiment, the frame 111 has a first opening in the first portion of the device 100 and a second opening in the second portion of the device 100. In some embodiments, the first plurality of coupling mechanisms are screws or other suitable coupling mechanisms.

A power connection port 114 is coupled to an end of the outer portion of the frame 111. The power connection port 114 is located in the second portion of the device 100. The power connection port 114 is adjacent to the second opening of the frame 111 and the blower 190. In other embodiments, the power connection port 114 is located elsewhere along the outer portion of the frame 111 or in the device 100.

The outer portion of the frame 111 is coupled to a first panel or wall 105 of the device 100. The first panel 105 includes a first surface having a substantially flat surface for coupling to the frame 111. A plurality of holes in the first surface of the first panel 105 being arranged to align with the plurality of holes of the frame 111.

The first surface of the first panel 105 has a similar shape of the outer portion of the frame 111. When the first surface of the first panel 105 is placed on or coupled to the frame 111, the first surface completely covers the outer portion of the frame 111 and extends in the first direction past an edge of the frame 111.

The first panel 105 having straight portions and curved portions following a perimeter of the frame 111. In some embodiments, the first panel 105 is a single continuous piece. In other embodiments, the first panel 105 includes a plurality of portions. In some embodiments, the plurality of portions of the first panel 105 include two portions having ends that contact each other.

The first portion of the first panel 105 extends past the frame 111 and is spaced from the second cover 101 by a gap 135. A dimension of the gap 135 being between the first portion of the first panel 105 and the second cover 101 sufficient to allow ambient air to be brought into the system and into the blower 190. In some embodiments, the dimension of the gap may be substantially or nearly equal to width of the curved portion of the frame 111 aligned with the gap.

A second surface of the first panel 105 is transverse to an extension of the plate 110. The second surface extends in the first direction, away from the second cover 101. A plurality of prongs or extensions 112 extend between the second cover 101 and the first panel 105 and can act like a filter to prevent dust and other particles from being brought into the blower.

The device 100 can a continuous gap around the full perimeter of the bottom of the system or the gap can be at the front portion or the rear portion of the system. Said differently, the device 100 intakes external air through a gap between the second cover 101 and the first panel 105. The blower 190 receives the air that it forces throughout the device 100.

Figure 5:
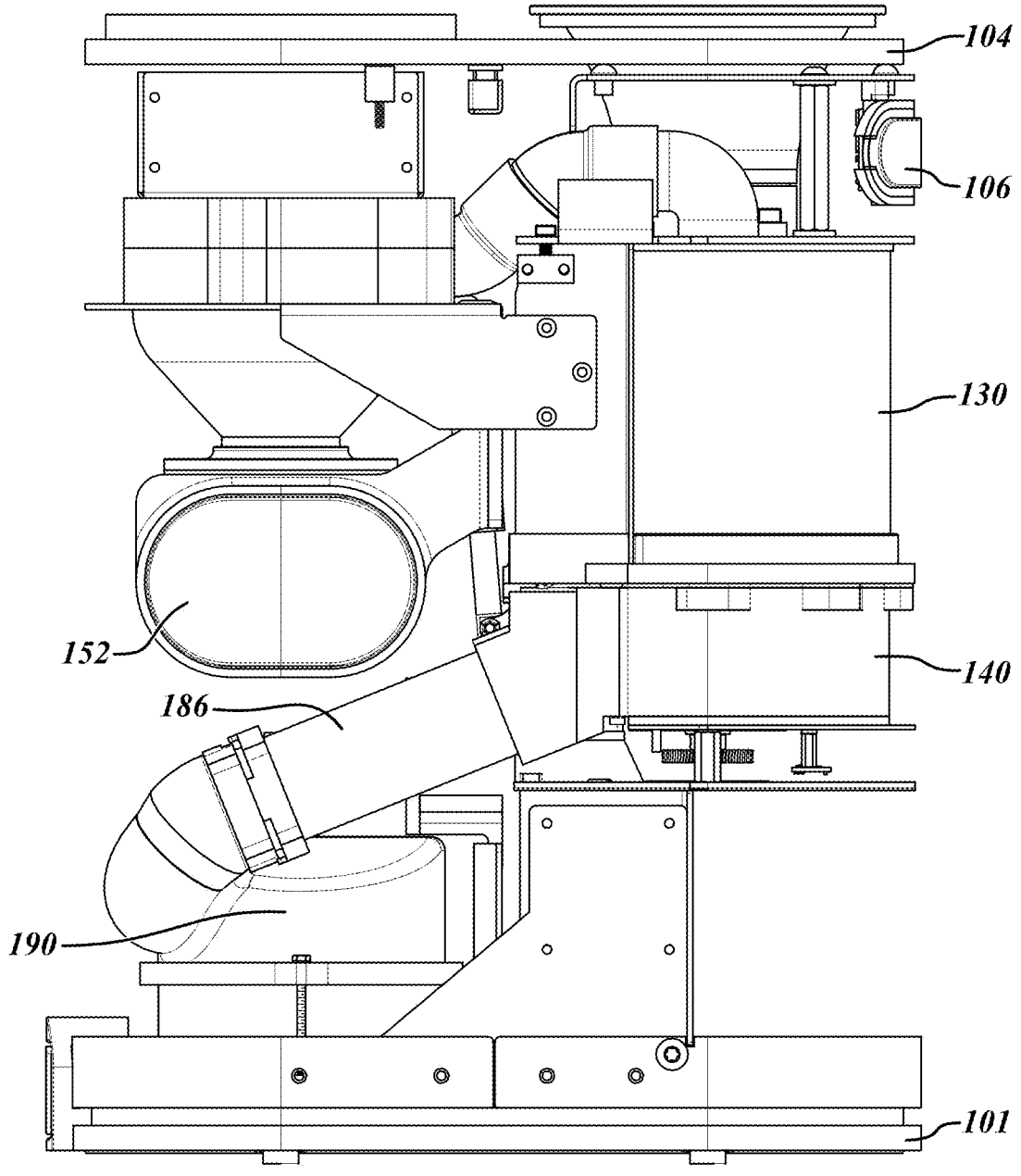
FIG. 5 is a side view of the device of FIG. 1 with an external body removed.

As in FIGS. 3 and 5, the blower or air moving device 190 has main cylindrical body having a bottom opening for receiving the air that is on a bottom of the boy (not shown). The main cylindrical body being coupled to the frame 111 via a plurality of coupling mechanisms. The bottom opening is in a base of the main cylindrical body facing the frame 111 in FIG. 3. The blower 190 is spaced from the frame 111 via a plurality of spacers. The spacers may also include coupling mechanisms to hold the blower in place and reduce vibrations. The blower creates suction to move the ambient air into the system through the gap.

After the air has entered the blower 190 via the bottom opening, the blower 190 forces the air into the heating assembly 186. The blower 190 includes a pump or fan that is configured to push the air throughout the device 100. The blower 190 includes a tubular section extending from the main cylindrical body and coupled across a center line toward the roasting chamber. In FIG. 5, the tubular section turns or curves towards the heating assembly 186. The tubular section may extend from the main body adjacent to the power connection port 114 or facing the back portion of the device 100 to a bottom of the roasting chamber and an air circulation chamber 140.

The heating assembly 186 of the device 100 heats the air necessary for the roasting process. Inside the heating assembly 186 is a heating element for heating the air. The heating assembly 186 having a first end and opening coupled to the blower 190, in particular the tubular section of the blower 190.

In FIG. 5, the heating assembly 186 has a tubular or tube shape and extends from the blower 190 at an angle up towards and to the central frame. The heating assembly 186 extends through an opening in the central frame to the air circulation chamber 140. The heating assembly includes a heating coil or resistive heating element (not shown) in the tubular section that heats the air to the user selected temperature to support the selected roasting profile.

Figure 6:
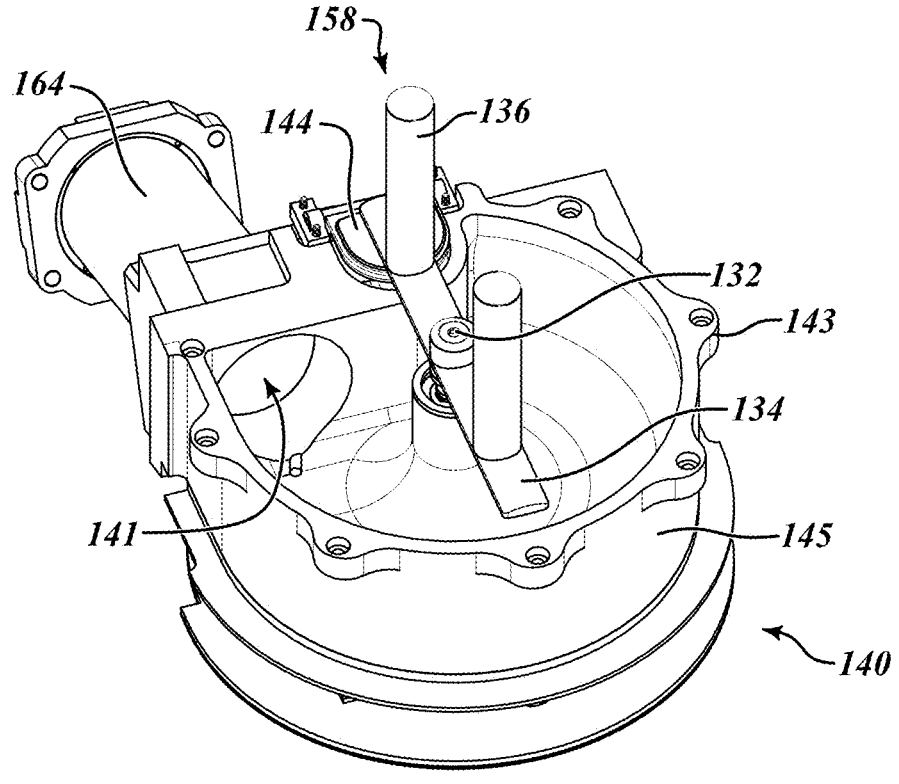
FIG. 6 is a perspective view of an agitator and air circulation chamber of the device of FIG. 1.

In FIG. 6, further details of the air circulation chamber 140 include sidewalls 145 extending from a base in the first direction (vertical in FIG. 6). The sidewalls include a curved sidewall portion and a straight sidewall portion. The sidewalls having first ends opposite second ends, with the first ends extending from the base. The air circulation chamber 140 has a central column 142 extending in the first direction away from the base. Between the sidewalls and the central column 142 is the opening. In some embodiments, the sidewalls and base are integral with each other.

The central column 142 extends from the base of the air circulation chamber 140 to a grate or perforated disc 138 of the roasting chamber 130. In the straight sidewall portion of the air circulation chamber 140 is a through opening 141 connected to the heating assembly 186.

The air circulation chamber 140 has a plurality of holed protrusions or openings 143 for coupling to the roasting chamber 130. The plurality of holed protrusions 143 are located at a second end of the curved sidewalls. Screws or other suitable coupling mechanisms couple the air circulation chamber 140 to the roasting chamber 130. Each holed protrusion of the plurality of holed protrusions 143 being substantially equally spaced apart around an outer circumference of the air circulation chamber 140. Each holed protrusion 143 having a hole or opening. In some embodiments, the plurality of holed protrusions 143 are curved or rounded. The air circulation chamber 140 may be made of a conductive material that can support the selected temperature or operate without issue when receiving the heated air from the heating element 164, through the tube from the blower 190.

In FIG. 3, a second end of the rotor drive shaft 182 is coupled to an agitator or rotatable assembly 158 is in the roasting chamber 130. The rotor drive shaft 182 is connected to a motor or electric motor configured to rotate the drive shaft 182 and thereby rotating the agitator. The motor is coupled to the central processing unit, which can be positioned in a space near the hopper or in the chamber below the air circulation chamber. The air circulation chamber includes curved sidewalls that support the air flow to evenly roast the beans. The air circulation chamber is not symmetrical around the drive shaft 182. A portion of the chamber that is closer to a central axis is smaller than a portion of the chamber that is closer to the front face. This creates a chute 162 coupled from the door 144 to the bean collector area at the bottom of the system.

Above the air circulation chamber 140, is the roasting chamber 130 with the perforated disc 138, in FIG. 3. The perforated disc 138 delimits a base of the roasting chamber 130. Surrounding the perforated disc 138 is a curved grooved edge 133 of the ledge region 118 of the device 100. The curved grooved edge 133 includes a first groove configured to receive and secure a removeable curved wall 131 that delimits a portion of the roasting chamber 130. The curved grooved edge 133 includes a second groove for securing and receiving a second curved wall 139 that delimits a portion of the roasting chamber 130.

The perforated disc 138 is circular and has a fourth diameter D4, see FIG. 1. The fourth diameter D4 is greater than the second diameter D2. In some embodiments, the fourth diameter D4 is greater than the first diameter D1. In other embodiments, the first and fourth diameters D1, D4 are substantially equal.

The perforated disc 138 has a plurality of holes, openings, apertures, or other suitable configurations that allow for passage of air or gas. The plurality of holes of the perforated disc 138 are spaced from each other. The holes are arranged in a radial pattern or concentric rings around a center of the disc. The holes are equidistant from each other. The concentric rings are equidistant from each other.

In other embodiments, the holes are arranged in alternative ways or patterns and spacings. The perforated disc 138 may be of stainless steel or other suitable conductive material. The perforated disc 138 is integral with the device 100. In other embodiments, the perforated disc 138 is separable from the device 100.

The device 100 includes a plurality of sensors 146 in the roasting chamber 130. The plurality of sensors 146 configured to detect noise, sound, temperature, humidity, or a combination thereof. The plurality of sensors 146 configured to determine precise coffee bean temperature.

The plurality of sensors includes a first sensor 146*b*. The first sensor 146 is in the roasting chamber 130. The first sensor 146 protruding at an angle from the grooved edge 133. The first sensor 146 protrudes in the roasting chamber 130 above the perforated disc 138.

The sensor 146 is a Resistance Temperature Detector (RTD) sensor or other suitable sensor for detecting sound, temperature, humidity, or a combination thereof. In this embodiment, the device 100 includes two sensors 146 spaced apart.

In some embodiments, the plurality of sensors 146 include a third sensor 146*a* extending from a top of the roasting chamber 130. In this embodiment, the third sensor is suspended in the roasting chamber 130 above the perforated disc 138. In some embodiments, the device 100 includes thirteen or more sensors 146. In a specific embodiment, there are four RTD sensors 146, with one sensor 146 in the chute 162, a second sensor 146 above the perforated disc 138 in the roasting chamber 130, and a third sensor and a fourth sensor extending from the grooved edge 133 in the roasting chamber 130. In some embodiments, the plurality of sensors 146 include at least one sensor to detect color of the beans, like an image sensor or other suitable sensor.

The removable wall 131 slides into the first, inner groove of the curved grooved edge 133. The second, outer groove of the curved grooved edge 133 being spaced farther away from the perforated disc 138 than the first groove. The removable wall 131 delimits the roasting chamber 130 having a cylindrical shape.

The removable wall 131 may be made of tempered glass or other suitable heat resistant material. The removable wall 131 extends from the grooved edge 133 to the hopper 120 for a first dimension D5.

The roasting chamber 130 includes a roasting chamber or first door assembly 144 between the chute 162 of the ledge region 118. The first door assembly 144 is coplanar with the perforated disc 138. The first door assembly 144 includes a straight edge transverse to a curved edge. A linear actuator 184 is coupled to the first door assembly 144 that can be in an open or closed configuration. When in the open configuration, the roasting chamber 130, the chute 162, and external environment are in fluid communication. When in the closed configuration, the roasting chamber 130 is sealed from the chute 162 and external environment.

The second curved wall 139 of the roasting chamber 130 extends in the first direction from a first end to an opposite second end. The first end of the second curved wall 139 is secured in the second groove of the grooved edge 133. The second end of the second curved wall 139 contacts a hopper region base 117 that delimits the roasting chamber 130.

The device 100 includes a first curved wall 107 coupled to the base frame 111 and extends transverse to the frame 111 in the first direction. The first curved wall 107 surrounds about half of the first opening of the frame 111. The first curved wall 107 is coupled to part of the outer portion of the frame 111. The first curved wall 107 is coupled to a circular recessed portion 116 of the device 100. The circular recess portion 116 is spaced from a portion of the first curved wall that is coupled to the frame 111. The first curved wall 107 has a first end opposite a second end. The first end being adjacent to the coupling of the circular recessed portion 116.

The circular recessed portion 116 is coupled to the first curved wall 107 using at least one screw or other suitable coupling mechanism. The circular recessed portion 116 has a substantially flat surface delimiting a bottom of a circular recess extending in the first direction. The flat surface has a diameter less than a diameter of an opening of the recess at a first surface. The first surface extends a thickness in the second direction. The circular recessed portion 116 is configured to securely hold or house a cup or resealable container for receiving a roasted food product.

A first portion of the circular recessed portion 116 abuts the first curved wall 107. A second portion of the circular recessed portion 116 contacts the second end of the first panel 105 in FIG. 3. The circular recessed portion 116 is spaced from the first opening of the frame 111.

The second end of the first curved wall 107 extends to a base 115 of an intermediary ledge or platform region 118 of the device 100 that includes the air circulation chamber 140. The ledge region 118 extending in the first portion of the device 100 and transverse to the first curved wall 107. The first curved wall 107 separates the base 115 of the ledge region 118 and the circular recessed portion 116.

The ledge region 118 extends from the central support over the circular recessed portion. The ledge portion does not extend past the first panel 105. The ledge region 118 includes a second panel or wall 113 that extends in the first direction. The ledge region 118 has a first end facing the circular recessed portion. Opposite the first end of the ledge portion is a second end adjacent to the roasting chamber 130. The second panel 113 extends between the first and second ends of the ledge region 118. The ledge region 118 is optional and other variations are encompassed in the scope of this disclosure.

The second panel 113 extends in the first direction for a third dimension. The third dimension of the second panel 113 is greater than the first dimension of the first panel 105. In some embodiments, the third dimension is more than double the first dimension.

A first chute or channel 162 extends through the ledge region 118. One end of the first chute 162 includes an opening 144 that is in fluid communication with an external environment. The opening 144 is in a bottom cover 115 of the ledge region 118. The bottom cover 115 is transverse to the second panel 113. The opening 144 can be in fluid communication with a cup or resealable container placed in the circular recessed portion 116 for receiving the roasted food product. In the ledge region 118 is a rotor drive shaft 182 that is in a central column 142 of the air circulation chamber 140. The rotor drive shaft 182 has a first end having a rotor in the ledge region 118. The ledge region 118 may also include a chip assembly, processor, servomechanisms, or other electrical components to control the spinning of a gear of the rotor drive shaft 182 thereby controlling the agitator. The rotor drive shaft 182 extends through the ledge region 118 and the air circulation chamber 140.

After roasting, the roasted food product exits the device 100 via a chute 162 that is in fluid communication with the roasting chamber 130 and the external environment. The blower 190 intakes external air via gaps between casing of the device 100 and pushes the air throughout the device 100. The air is heated via the heating assembly 186. A food waste product and air are put through a waste collection system to separate and collect the food waste. The air is filtered through the smoke suppression system 170 before exiting the device via vent holes of a lid 180.

The central frame extends in a first direction between a first or top cover 104 of the device 100 and a second or bottom cover 101 of the device 100. The central frame is between a first or front portion of the device 100 and a second or back portion of the device 100. A first end of the central frame is coupled to a base frame 111 of the device. A second end opposite the first end is adjacent to the top cover 104. The central frame has a plurality of openings and holes. The plurality of openings are shaped to receive a number of other components of the device 100. The central frame has a rectangular shape and substantially flat surfaces. A first surface of the central frame faces the back portion of the device 100, whereas a second surface opposite the first surface faces the front portion of the device 100. The front portion of the device 100 has a display screen 106 and the back portion of the device 100 may include a power connection port 114.

The first and second covers 104, 101 extend in a second direction transverse the first direction between the front and back portions of the device 100. The first cover 104 is made of wood or other suitable material. The second cover 101 includes a wood frame base and a metal plate coupled to the wood frame base.

The first and second covers 104, 101 have first curved ends in the first portion of the device 100. The first portion of the device 100 including a hopper 120, for feeding a food product or coffee cherry into the device 100, connected to a roasting chamber 130 connected to an air circulation chamber 140. The first cover 104 has a first opening 122 for receiving the food product for roasting.

Second curved ends of the first and second cover 104, 101 opposite the first curved ends are in the second portion of the device 100. The second portion of the device 100 including a smoke suppression system 170 and a blower 190. The smoke suppression system 170 is connected to a cyclone funnel 156 connected to a waste container 150. The blower 190 is connected to a heating assembly 186.

Figure 7:
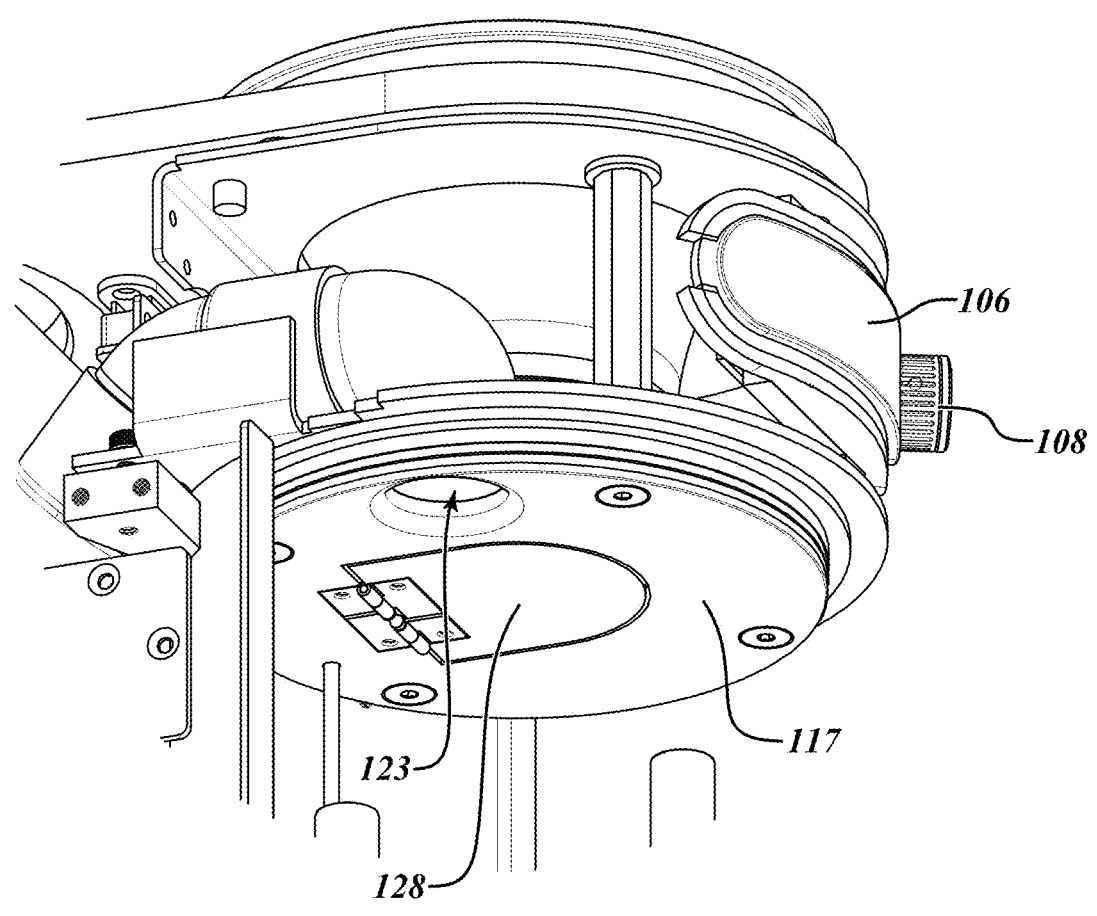
FIG. 7 is a bottom view of the hopper of FIG. 1.

In FIG. 7, adjacent to the hopper 120, and above the roasting chamber, the device 100 includes a vent hole 123. The vent hole 123 is in fluid communication with the roasting chamber and the waste container assembly. A second channel is coupled to the vent hole 123 and the cyclone chamber 156, see FIG. 3. The cyclone funnels to the removeable waste container.

The cyclone funnel 156 has a first end with a first opening. The first opening of the cyclone funnel 156 extending for a dimension in the second direction, left to right or horizontal in the illustration. Opposite the first end of the cyclone funnel 156 is a second end with a second opening. The second opening of the cyclone funnel 156 extending for a second dimension in the second direction. The second dimension is less than the first dimension.

A curved surface of the cyclone funnel 156 extends in the first direction between the first and second ends of the cyclone funnel 156. The curved surface tapers from the first opening to the second opening.

The cyclone funnel 156 is in fluid communication with the waste container 150. The second end of the cyclone funnel 156 is coupled to a waste container region or portion of the device 100 configured to secure the waste container 150.

The waste container or chaff collector 150 is between the cyclone funnel 156 and the blower 190, see FIG. 3. The roasting chamber 130 being adjacent and spaced from the waste container 150 by the central axis. In FIG. 5, the removable waste container or drawer 150 for collecting food waste product is coupled the cyclone funnel 156. The waste container 150 is configured to slide in and out in the second direction from either side. The device 100 includes a waster container region or portion configured to secure the waste container 150.

The waste container 150 may be transparent. The waste container 150 is made of glass, plastic, or other suitable material. The waste container 150 includes two windows 152 opposite each other. The two windows 152 have an oblong or oval shape. In other embodiments, the windows 152 have other suitable shapes and designs.

The smoke suppression system 170 filters smoke, air, and other particulates. The smoke suppression system 170 is in fluid communication with the cyclone funnel 156 via a second chute or channel 160. The smoke suppression system 170 includes a chamber. The chamber of the smoke suppression system 170 may have a rectangular, cylindrical, or other suitable shape for receiving or securing a filter.

The chamber of the smoke suppression system 170 extends for a sixth dimension in the second direction. The sixth dimension being substantially the same or similar with the first dimension of the cyclone funnel.

The chute 160 has a first end connected to the smoke suppression system 170. A second end opposite the first end of the chute 160 is in the cyclone funnel 156. The first end of the chute 160 has a first opening with a seventh dimension extending in the second direction. The chute 160 extends and tapers from the first end to the second end. The second end has a second opening with an eighth dimension extending in the second direction. The seventh dimension is greater than the eighth dimension. The second end of the chute 160 is spaced from the second end of the cyclone funnel 156. The second end of the chute 160 is suspended in the cyclone funnel 156.

The first end of the chute 160 is centrally located in the smoke suppression system 170. A base of the smoke suppression chamber having a curved recess in an edge. The curved recess of the base having a diameter that is substantially similar to the seventh dimension. The first end of the chute 160 being coupled to the curved recess of the base of the smoke suppression chamber.

The filter in the smoke suppression system 170 is removable from and couplable to the smoke suppression system 170. The filter may be a carbon filter or other suitable filter. The filter may have a shape that substantially fills an entire cavity of the smoke suppression chamber.

In some embodiments, more than one filter can be used in the smoke suppression system 170. In a preferred embodiment, the plurality of filters includes at least three different filters or layers of filters stacked on in each other with at least one of the filters being different from the other filters in the stack. In an embodiment, the filters are all the same. The filter may have a circular or rectangular shape. In other embodiments, the filter has a square or rectangular shape.

A perforated lid or cover 180 is over the smoke suppression system 170. The filter being between the perforated lid 180 and the base of the smoke suppression chamber. The filtered air exiting the device 100 via the perforated lid 180. The perforated lid 180 is circular with a plurality of through, oblong openings. The oblong openings being spaced from each other and arranged radially around a center of the lid 180. The lid 180 includes a protruding edge. The device 100 includes an upper frame portion having a grooved surface configured to receive and secure the lid 180.

Referring to FIG. 1, a third curved panel 125 extends in the second direction to cover the hopper region in FIG. 1. The third curved panel 125 has an opening for receiving the display 106 and dial button 108.

The display 106 and dial button 108 is located between the hopper region base 117 and the first cover 104. The display 106 is configured to receive signals and communications from a processor or CPU and outputs roasting information on the display 106 to the user. The dial button 108 and displayed 106 are for interacting with the device 100. The display 106 is configured to present various information to the user, such as operating characteristics, roasting profile, recipe, status of the device, and others. The dial button 108 is pressable and rotatable.

A curved panel 102 is coupled to the device 100 via a plurality of coupling mechanisms in FIG. 1. The curved panel 102 is curved in a manner that opposite ends face each other. The curved panel 102 covers the back portion and straight sides of the device 100. The curved panel 102 has four rounded corners, with two rounded corners adjacent the base portion of the device 100 and the other two rounded corners adjacent the top portion of the device 100. The ends of the curved panel 102 extend over central portions of the device 100 and portions of the first, second, and third curved panels 105, 113, 125.

The curved panel 102 extends in the first direction between the top and bottom covers 104, 101. The curved panel 102 extends in the second direction to cover portions of the hopper region, the roasting chamber 130, the air circulation chamber 140, and the recessed area for housing the container on both sides of the device 100.

The curved panel 102 has a plurality of openings. Two openings of the plurality of openings have the same size and shape configured to expose the windows 152 of the waste container 150. The two openings facing each other and being on opposite sides or ends of the curved panel 102.

The curved panel 102 includes a recess or third opening at a lower bottom edge configured to expose the power connection port 114 that may extend through the recess of the curved panel 102.

The curved panel 102 may be a single integrated piece or include multiple pieces.

In this embodiment, the plurality of coupling mechanisms include four screws located at four rounded corners of the curved panel 102.

Figure 8:
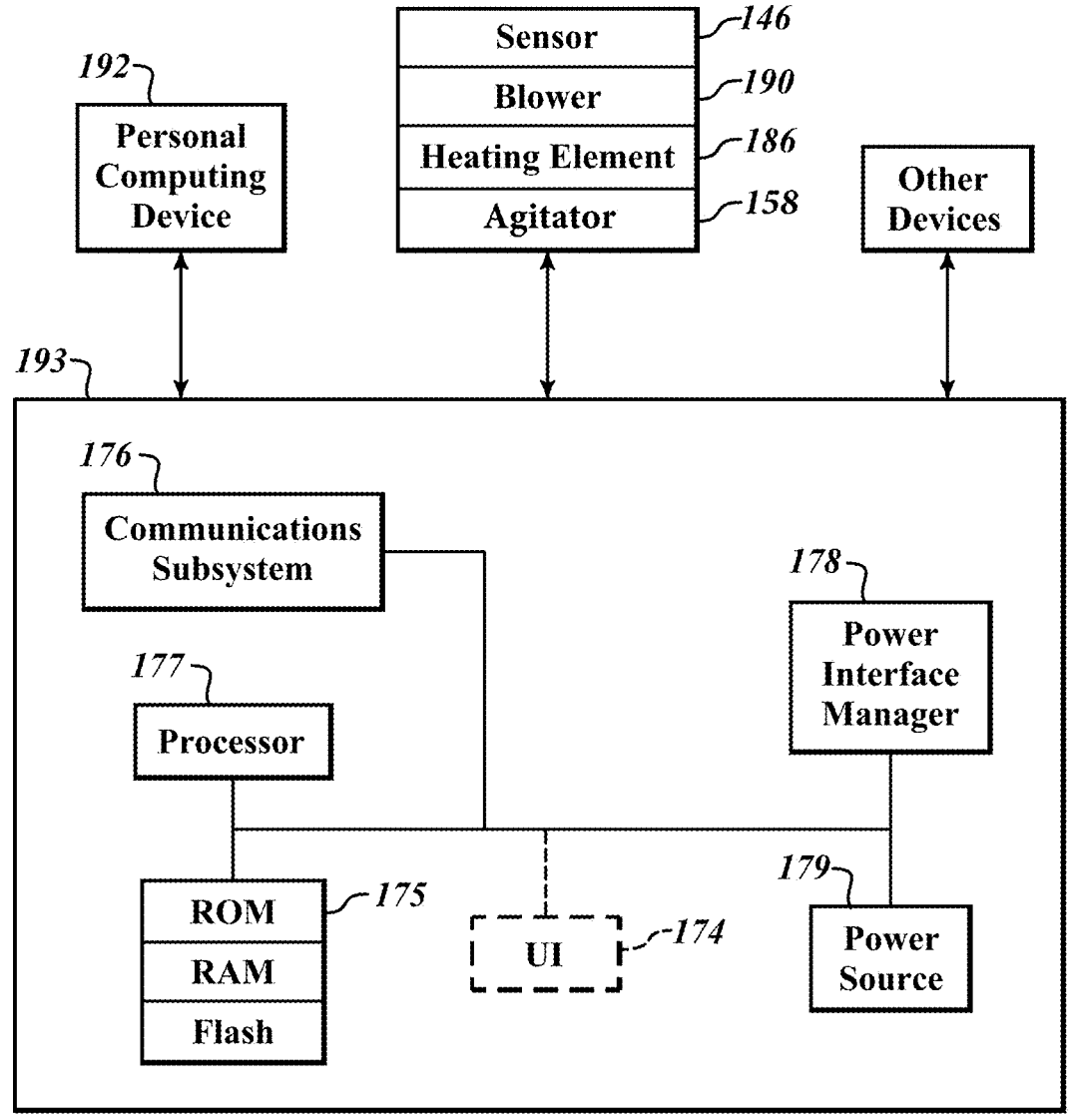
FIG. 8 is a block diagram of a central processing unit the device or FIG. 1.

FIG. 8 is a diagram of an electronic system or controller 193 of the system 100 represented in block diagram or schematic form. As further described below, the controller 193 is suitable for executing or otherwise performing at least some embodiments or techniques described herein with respect to the system 100. The physical or hardware aspects of the controller 193 may be located internal to a housing or other device of the system 100.

The controller 193 includes a processor 177, for example a microprocessor, digital signal processor, programmable gate array (PGA) or application specific integrated circuit (ASIC). The controller 193 includes one or more non-transitory storage mediums, for example read only memory (ROM), random access memory (RAM), and/or Flash memory or other physical computer- or processor-readable storage media collectively designated as 175 in communication with the processor 177. The non-transitory storage mediums 175 may store instructions and/or data used by the processor 177 and the controller 193 generally, for example an operating system (OS) and/or applications. The instructions as executed by the processor 177 may execute logic to perform the functionality of the various implementations or techniques of the devices and systems described herein, including, but not limited to, receiving signals, instructions, or other data from aspects of the system 100 and controlling operating parameters of the system 100 in response, or executing instructions for certain roasting recipes selected by a user through a computing device, among others.

The controller 193 may include a user interface 174 ("UI") to enable a user to operate or otherwise provide input to the controller 193 or system 100 described herein regarding the operational state or condition of the controller 193 and/or the system 100. Additionally, the user interface 174 may include a number of user actuatable controls accessible on an exterior of the system 100. For example, the user interface 174 can be the display 106 in FIG. 1 and may include a number of switches or keys operable to turn the system 100 ON and OFF and/or to set various operating parameters of the system 100, such as recipe, roast time, air speed, roast temperature, and many others.

In some embodiments, the user interface 174 may include a display, for instance a touch panel display. The touch panel display (e.g., LCD or LED with touch sensitive overlay) may provide both an input and an output interface for the user. The touch panel display may present a graphical user interface, with various user selectable icons, menus, check boxes, dialog boxes, and other components and elements selectable by the end user to set operational states or conditions of the system 100. The user interface 174 may also include one or more auditory transducers, for example one or more speakers and/or microphones. Such may allow audible alert notifications or signals to be provided to the user as a result of manual interaction with the user interface 174. Such may additionally, or alternatively, allow a user to provide audible commands or instructions. The user interface 174 may include additional components and/or different components than those illustrated or described, and/or may omit some components.

The switches and keys of the graphical user interface 174 may, for example, include toggle switches, a keypad or keyboard, rocker switches or other physical actuators of the type described herein. The switches and keys or the graphical user interface 174 may, for example, allow a user to turn ON the system 100, among the additional functionality described herein.

The controller 193 includes a communications sub-system 176 that may include one or more communications modules or components which facilitate communications with various components of one or more external devices, such as a personal computing device or mobile device 192 in an embodiment. The communications sub-system 176 may provide wireless or wired communications to the one or more external devices and may include wireless receivers, wireless transmitters and/or wireless transceivers to provide wireless signal paths to the various remote control device components or systems of the one or more paired devices. The communications sub-system 176 may, for example, include components enabling short range (e.g., via Bluetooth®, BLE ("Bluetooth® low energy"), near field communication (NFC), or radio frequency identification (RFID) components and protocols) or longer range wireless communications (e.g., over a wireless LAN, Low-Power-Wide-Area Network (LPWAN), satellite, or cellular network) and may include one or more modems or one or more Ethernet or other types of communications cards or components for doing so. The communications sub-system 176 may include one or more bridges or routers suitable to handle network traffic including switched packet type communications protocols (TCP/IP), Ethernet or other networking protocols.

The controller 193 further includes a power interface manager 178 that manages supply of power from a power source 114 to the various components of the controller 193 and the system 100. The power interface manager 178 is communicatively coupled to the processor 177 and the power source 114. Alternatively, in some embodiments, the power interface manager 178 can be integrated in the processor 177. The power source 114 may include an external power supply, or a rechargeable or replaceable battery power supply. The power interface manager 178 may include power converters, rectifiers, buses, gates, circuitry, etc. in some embodiments. In particular, the power interface manager 178 can control, limit, and/or restrict the supply of power from the power source 114 to at least the blower 190, the agitator 158, and the heating element 186.

In some embodiments, the instructions and/or data stored on the non-transitory storage mediums 175 that may be used by the processor 177 and the controller 193 generally, such as, for example, memory 175, includes or provides an application program interface ("API") that provides programmatic access to one or more functions of the controller 193. For example, such an API may provide a programmatic interface to control one or more operational characteristics of the system 100, including, but not limited to, one or more functions of the user interface 174, processing and/or storing and/or transmitting the data received from the sensors 146, and controlling characteristics of the blower 190, the agitator 158, the heating element 186, among others. Such control may be invoked by one of the other programs, other remote device or system, or some other module. In this manner, the API may facilitate the development of third-party software, such as various different user interfaces and control systems for other devices, plug-ins, and adapters, and the like to facilitate interactivity and customization of the operation and devices within the system 100.

In an embodiment, components or modules of the controller 193 and other devices within the system 100 are implemented using standard programming techniques. For example, the logic to perform the functionality of the various embodiments or techniques described herein may be implemented as a "native" executable running on the controller 193, e.g., processor 177, along with one or more static or dynamic libraries. In other embodiments, various functions of the controller 193 may be implemented as instructions processed by a virtual machine that executes as one or more programs whose instructions are stored in memory 175. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors 177 of the controller 193 to perform the functions of the controller 193. The instructions cause the microprocessor 177 or some other processor, such as an I/O controller/processor, to process and act on information received from the sensors 146, personal computing device 192, or other external device to provide the functionality described herein.

The embodiments described above may also use well-known or other synchronous or asynchronous client-server computing techniques. However, the various components may be implemented using more monolithic programming techniques as well, for example, as an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc.), providing a communication channel between aspects of the system 100 and/or controller 193 as well as to external devices 184 or personal computing systems 192, running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the controller 193.

In addition, programming interfaces to the data stored on and functionality provided by the controller 193, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by the controller 193 and overall system 100 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are also possible in other embodiments. Other functionality could also be provided by each component/module, or existing functionality could be distributed amongst the components/modules within the system 100 and/or controller 193 in different ways, yet still achieve the functions of the controller 193 and the system 100.

Furthermore, in some embodiments or implementations, some or all of the components of the controller 193 and components or other devices within the system 100 may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

It will be appreciated that the computing systems and devices described herein, including with respect to controller 193 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, biometric monitoring devices, PDAs, wireless phones, Internet appliances, and various other consumer products that include appropriate communication capabilities. In addition, the functionality provided by the system 100 may in some embodiments be distributed in various modules. Similarly, in some embodiments, some of the functionality of the system 100 may not be provided and/or other additional functionality may be available. In addition, in certain implementations various functionality of the system 100 may be provided by third-party partners of a user of the system 100. For example, data collected by the system 100 may be provided to a third party for analysis and/or metric generation, or recipes may be provided from a third party to a database accessible to the user. In some embodiments, the third party is another user such that a first user's recipe can be shared with a second user and the first user's recipe can control the operating characteristics of the second user's system.

It will also be appreciated that, while various items are illustrated as being stored in memory 175 or on storage while being used, these items or portions of them may be transferred between memory 175 and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs and/or data structures, such as by execution of software instructions of the one or more software programs and/or by storage of such software instructions and/or data structures.

The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

In some embodiments, the memory 175 stores instructions, information, or other data that is executed by the processor 177 to activate the blower 190, the agitator 158, the heating element 186, and the sensor 146 according to a roasting recipe selected by a user input on the personal computing device 192, which may be a mobile device in wireless communication with the communications subsystem 176 of the controller 193. More specifically, the user may select a recipe according to a type or supplier of a certain coffee cherry bean and the personal computing device 192 sends instructions, information, signals, or other data to the communications subsystem 176 of the controller 193. The communications subsystem 192 interfaces with the processor 177, which interfaces with the memory 175 to execute the instructions as a series of distinct or simultaneous actions. For example, execution of the instructions may cause the processor 177 to activate the power interface manager 178, which enables a selected amount of power to be transmitted from the power source 114 to the blower 190, the agitator 158, the heating element 186, and over a selected period of time or instances according to the recipe selected by the user.

In further embodiments, the sensor 146 sends instructions, information, signals, or other data to the processor 177, which determines, based on the information received from the sensor 146, whether to adjust the operational characteristics of the blower 190, the agitator 158, and the heating element 186. For example, the sensor 146 may be a speaker or microphone that collects data corresponding to the sounds occurring proximate the roasting chamber 130 of the roasting assembly. In an embodiment, the sensor 146 is at least a microphone. The sounds incident on, and detected by, the microphone may be operational sounds from the blower 190, the agitator 158, the heating element 186, and waste collection assembly 148 as well as sounds indicative of certain characteristics of the food product in the chamber 130. The processor 177 may execute instructions stored in memory 175 to analyze the spectrum of sounds detected by the microphone 146 and filter out known frequencies and volumes of sounds corresponding to operation of the system 100 while simultaneously looking for a specific spike in a given frequency that corresponds to cracking of the food productor beans, such as the first crack when roasting coffee cherry beans. The processor 177 may also execute instructions in memory 175 to determine first crack duration and the time to the first crack (i.e, pre-crack duration) and compare this information to the expected results based on the recipe and adjust operational characteristics of the system 100 in response accordingly.

For example, if the pre-crack duration is too long (i.e., first crack occurs later than expected based on recipe), the processor 177 may execute instructions in memory 175 and interface with the power interface manager 178 to supply more power from power source 114 to the heating element 186 to increase the roast temperature, to increase or decrease the number of rotations per minute of the agitator 158, and/or to the blower 190 to increase or decrease the air flow speed. The same process can be applied to increase power to the blower 190 and decrease power to the heating element 186 if the pre-crack duration is too short (i.e., first crack occurs sooner than expected based on recipe), or if the first crack duration is too long or short.

In another non-limiting example, the sensor 146 is, or includes, one or more thermocouples, such as a group of thermocouples in the roasting assembly or chamber 130. The processor 177 may execute instructions stored in memory 175 to continuously communicate with, and monitor, the one or more thermocouples to measure the food product and determine an accurate temperature of the food product. Based on the determined temperature, the processor 177 executes further instructions stored in memory 175 to control the amount of power to the heating element 186 or the blower 190, or both, to achieve a certain shape of curve for the food temperature, or more specifically, a certain shape of curve for change in food temperate over time in order to maintain a certain rate of rise curve for food product temperature. Where the food product is green coffee cherry seeds, the rate of rise curve may be for bean temperature that is part of a recipe for roasting the green coffee cherry seeds.

In one embodiment, the CPU 193 is configured to receive, in real-time, temperature measurements from each of the thermocouples or sensors 146 associated with at least the roasting chamber 130. The CPU 193 is configured to average the temperature measurements at specific time intervals or pre-selected times during a roasting duration to identify in the specific system when the beans are accurately roasted. Said differently, an average of the temperatures from the sensors is utilized in real-time to determine, at least in part, when the roasting is complete. The average of the temperatures can be used alone, or in conjunction with the microphone for crack detection, to determine when to stop roasting.

In some embodiments, the one or more sensors 146 may include imaging devices and/or a gas sensor with the processor 177 executing instructions stored in memory 175 in much the same way to modify operational characteristics of the system 100. For example, if the imaging device determines that the coffee cherry seeds are turning brown too quickly, the coffee cherry seeds may be roasting too quickly and the processor 177 executes instructions to memory 175 to decrease power to the heating element 102 and increase power to the blower 190. Of course, in any of the above examples, the processor 177 may also execute instructions in memory 175 to only adjust one operating characteristic (i.e., temperature of heating element 186 or air speed output by the blower 190) while all other characteristics remain constant.

In an embodiment, the one or more sensors 146 are, or include, one or more gas sensors and/or moisture sensors. The processor 177 executes instructions stored in memory 175 to communicate with the gas and/or moisture sensors to detect a change in volatile organic compounds in the food product over time and/or change in moisture levels in the food product over time and compares the detected change to a recipe stored in memory 175 to calculate whether the time to first crack is faster or slower than expected. If the time to first crack is different than expected, the processor 177 executes further instructions in memory 175 to adjust the power to heating element 186, rotations of the agitator 158, and/or blower 190 accordingly. In some embodiments, the moisture sensors also measure water content in the food product and the processor 177 executes instructions in memory 175 to adjust the power to the heating element 186 to a pre-heat temperature or otherwise initiate a drying process prior to, or as part of, the roasting process.

In an embodiment, the system 100 is agnostic to conditions in an external environment around the system 100, meaning that the same quality and consistency of the roasted food product can be achieved regardless of the temperature, humidity, and other characteristics of the external environment around the system 100. For example, the system 100 may include a Global Positioning System ("GPS") receiver or transceiver that provides a location for the system 100 with the process 177 executing instructions stored in memory 175 to communicate with a remote device to obtain location-based external environment data, such as temperature from a public weather agency. Further, the processor 177 may execute instructions stored in memory 175 to obtain external environment data from a personal computing device 192, which may be a user's mobile device, via the communications subsystem 176. In yet a further non-limiting example, the sensors 146 may include temperature, humidity, and other like sensors exposed to an external environment around the system 100 to obtain data regarding the characteristics of the external environment around the system 100. In some embodiments, the system 100 gathers data from only one or more than one of the above sources. Irrespective of the source of the data, the processor 177 executes instructions in memory 175 to adjust the heating element 186 and/or blower 190 (or other operating characteristic of the system 100) based on the external environment around the system 100 to produce results (i.e., a roasted food product) with the same quality and consistency irrespective of the conditions of the external environment. In this way, the processor 177 executes instructions stored in memory 175 to adjust operational characteristics of the system 100 to ensure uniformity of roast in a feedback control loop with the one or more sensors 146. Advantageously, this functionality is provided in the form factor of a countertop appliance to simplify the roasting process and enable successful roasting at consumer scale. This feedback control loop also accounts for variations in batch size because the recipe is adjusted based on the detected characteristics of the roast to ensure uniformity with the recipe.

In an embodiment, the memory 175 stores further instructions that are executed by the processor 177 associated with a cooling operation in the chamber or container. For example, the instructions may include instructions to terminate power to the heating element 186 and activating the blower 190 for a selected period of time, such as 10 seconds or less, 30 seconds or less, 1 minute or less, or 5 minutes or less, inclusive of all intervening values in some non-limiting examples. The cooling operation may occur once, or more than once, depending on the detected characteristics of the coffee cherry seeds in the chamber according to the techniques of the present disclosure.

In some embodiments, the controller 193 and the system 100 generally are in communication with other devices 114, which may be a network or a database stored on remote servers or personal computing devices for providing new recipes accessible via the personal computing device 192. Further, the controller 193 and the system 100 may be in communication with other such systems 100 and/or networked appliances, such as in a "smart home" system using any of the communication protocols described herein. Such networked appliances may include, but are not limited to, smart home speakers such as Amazon Alexa®, Google Home®, and Apple Siri® products, among others.

For example, for a given bean, the system can be utilized to test the multiple different roast profiles (charge temperature (pre-heat temperature at which roasting starts), heat setting, fan setting, agitation rotations per minute settings, and drop temperature (temperature at which the heating ends and cooling starts) across the time duration of roasting and cooling to create one most optimal roast profile for each roast level (such as blonde, light, medium, or dark roast). It is envisioned that the system can be programmed to handle five or more roasting levels. The roast profile settings are based on the inlet temperature sensor, exhaust temperature sensor, and average of reading from two bean temperature sensors, such as the prong sensors 146 at the bottom of the chamber 130 in FIG. 3. Location agnostic technology will take into consideration the ambient temperature and ambient humidity to reproduce the optimal roast profiles irrespective of the location of the user and the roasting system. This enables users to share roast profiles within an ecosystem, through an API or website or other connectivity, and have the roast profile implemented accurately and successfully anywhere in the world.

The system is configured to provide at least five different roasting levels like light and dark. The system is configured to receive bean origin data and use this to adjust the roasting parameters based on the selected roasting level. Bean origin data like altitude can be utilized to achieve the various roasting levels. A plurality of processing methods will be stored in the system and accessible for impromptu selection by the user or as part of a stored roasting profile. A plurality of varietals of coffee will be programmed into the system so that different roasting levels and profiles can be accessed by the user. Other bean origin data, like time of harvest, soil types, bean size (volume), density of beans, batch size (weight in grams), can be included in the roasting levels or profiles.

Ambient temperature and humidity are collected by the system and processed before each roast to produce an optimal roast profile for a selected bean, selected batch size, selected roast level, and physical location. All of this information will be collected and stored in a network that each roasting device can connect to through the communication sub-system 176. Each roasting device will receive information about the different beans ordered by the user to be roasted in their roasting device. This information, including roasting profile options and instructions can be automatically transmitted to the system or can be uploaded by the user when time to roast the beans. For example, a bag of beans can include a QR code that can be read by the user's personal computing device, like a mobile phone. The mobile phone may be wireless coupled to the roasting device through an app or a website, where the QR code enables the user to activate and populate the purchased bean information on the display, including roasting profiles.

The system allows the user to create and save their own roasting profiles for specific beans to be reused within the same system with future purchased beans or shared with the community of users of the roasting system.

Figure 9:
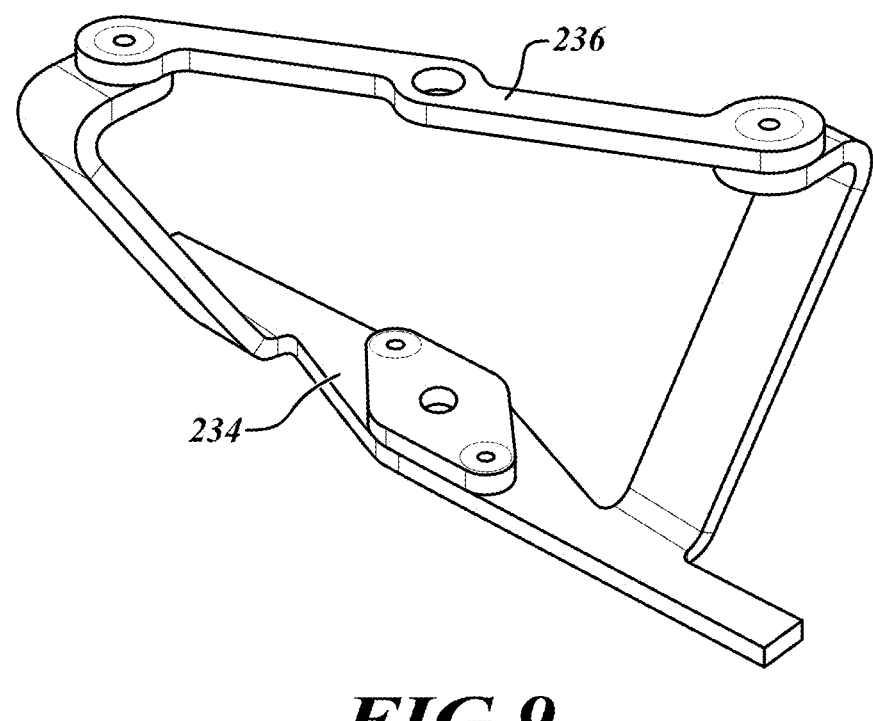
FIG. 9 is alternative embodiment of an agitator.

FIG. 9 is another embodiment of an agitator including two portions. A first portion 234 is a support blade with a central portion for coupling to a countertop roasting device. The central portion has a first plurality of holes. The first portion 234 has a main blade portion with two extensions extending from opposite sides. The two extensions have curved ends that curve inwards. The curved ends are coupled to a second portion 236. The second portion 236 has a second plurality of holes.

Figure 10:
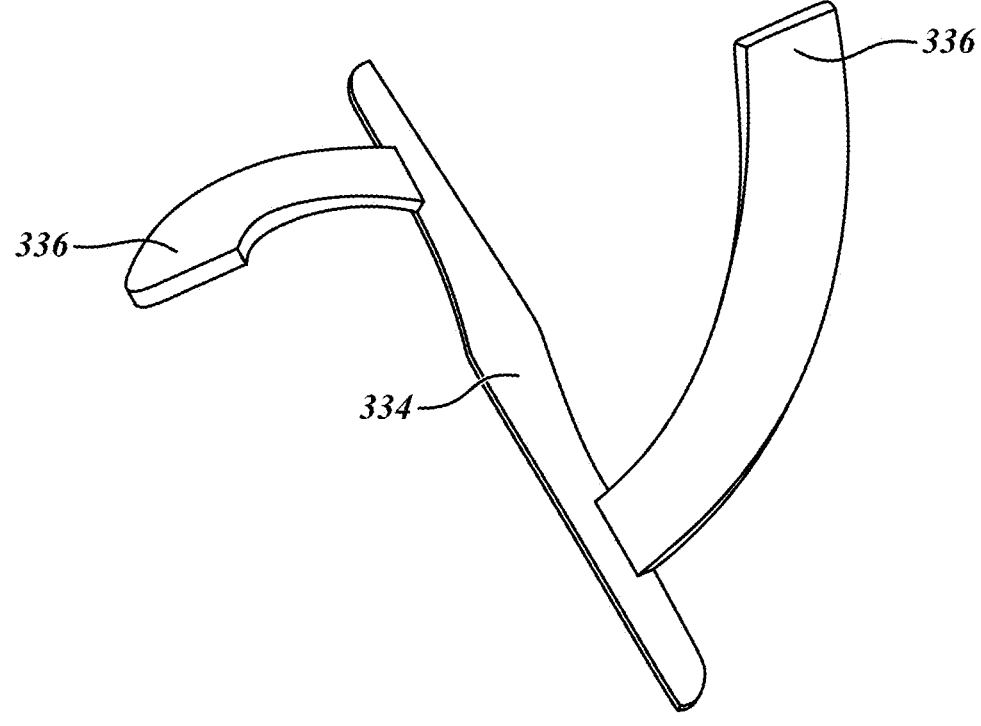
FIG. 10 is alternative embodiment of an agitator.

FIG. 10 is another embodiment of an agitator. The agitator having a substantially flat support piece or blade 334 coupled to two substantially flat curved arms 336. The curved arms 336 being coupled adjacent opposite ends of the support piece 334. The curved arms 336 are coupled to a first surface of the support 334. First ends of the curved arms 336 are coupled to the support piece 334. Second ends, opposite the first ends, of the curved arms 336 extend away from the support piece 334. The curved arms 336 are coupled and orientated in a manner where the second ends of the curved arms 336 extend towards a center of the support piece 334. The agitator may include a central connection point for coupling to a countertop roasting device. The central connection point may be a hole in the support piece 334. The two opposing curved arms 336 may be mirror symmetrical on opposite sides of a vertical axis through a center of the blade 334. In an embodiment, the two opposing curved arms 336 extend toward each other and curve in a partial helical pattern around the central vertical axis.

Figure 11:
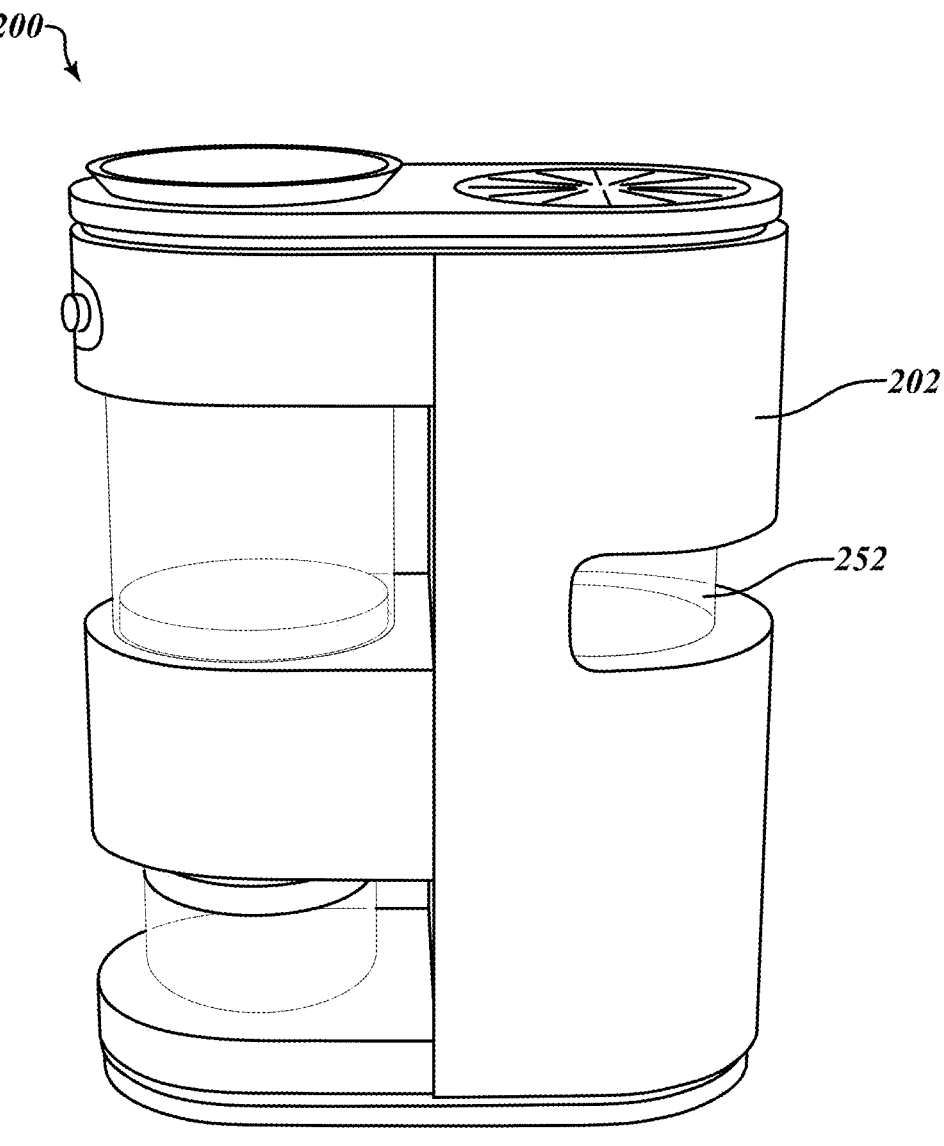
FIG. 11 is alternative embodiment of a coffee roasting device.

FIG. 11 is another embodiment of the countertop roasting device 200 that is similar to the other roasting devices in this disclosure, including a hopper, a smoke suppression system, a roasting chamber, etc. This device 200 includes a different a waste container 252 according to another embodiment. The waste container 252 is configured to be pulled out of or placed in a back portion of a countertop roasting device 200. A back panel 202 has a one cut-out or opening in the back to expose the waste container 252. The waste container 252 can be clear so that a user can see when the chaff has filled or nearly filled the waste container.

Figure 12:
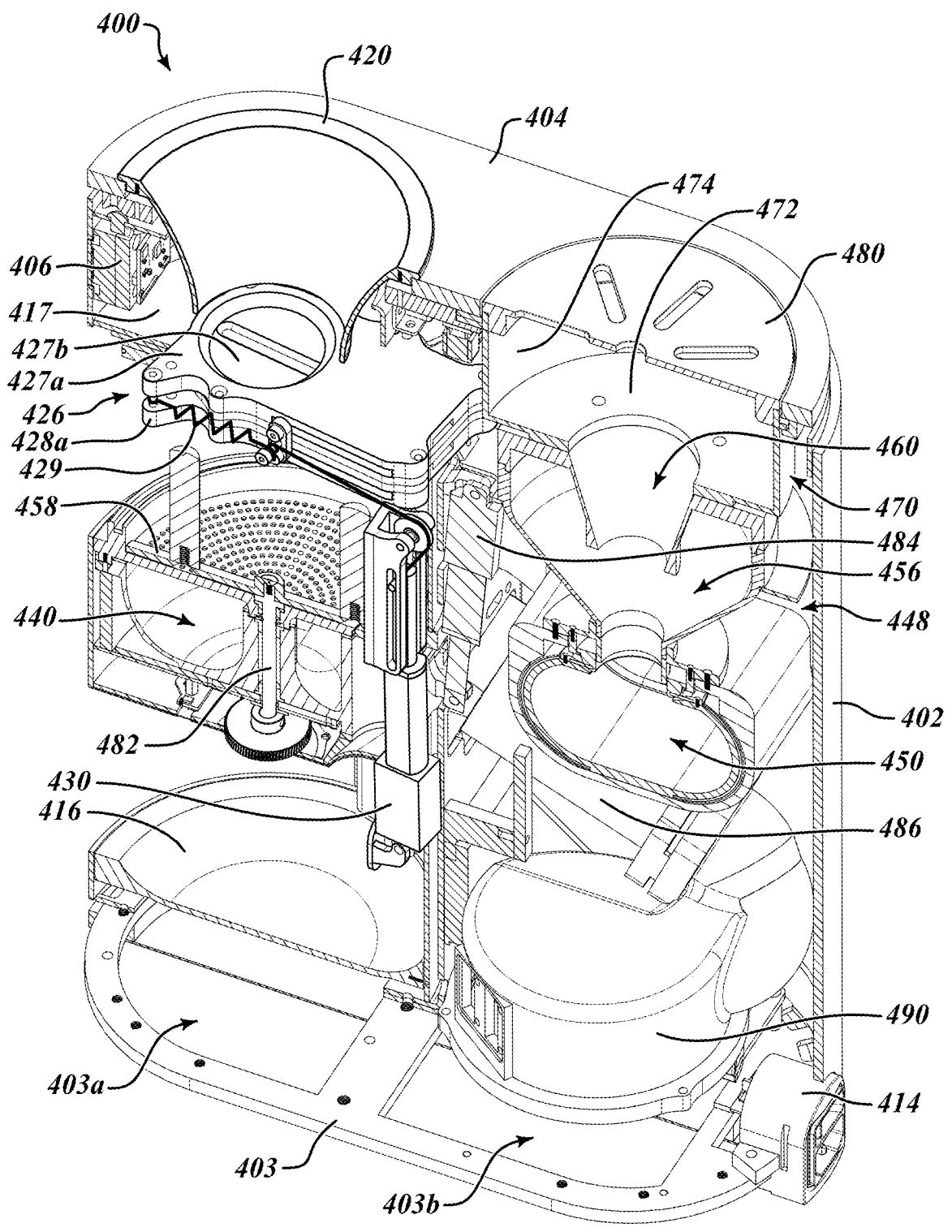
FIG. 12 is an alternative embodiment of a door assembly or subsystem of a coffee roasting device.

In FIG. 12, an alternative embodiment of a coffee roasting device 400 includes an alternative embodiment of a hopper door assembly 426 and a smoke suppression system 470. The device 100 has top device cover 404 as described for FIG. 1. The top device cover 404 has a plurality of openings with a first opening in a front portion of the device 400 and a second opening in a rear portion of the device 100. A hopper 420, as described for FIGS. 1, 3, and 4, is in the first opening of the top device cover 404. A first end of the hopper 420 extends through the first opening of the top device cover 404.

A second end of the hopper 420 includes the hopper door assembly 426. The second end of the hopper 420 is opposite the first end of the hopper 420. In other embodiments, the hopper door assembly 426 is coupled to the hopper 420. The hopper door assembly 426 may extend partially past a central frame of the device 400. The hopper door assembly 426 is coupled to a hopper region base 417 that is coupled to the central frame. A linear actuator 430 of the hopper door assembly is coupled to the central frame.

Figure 13:
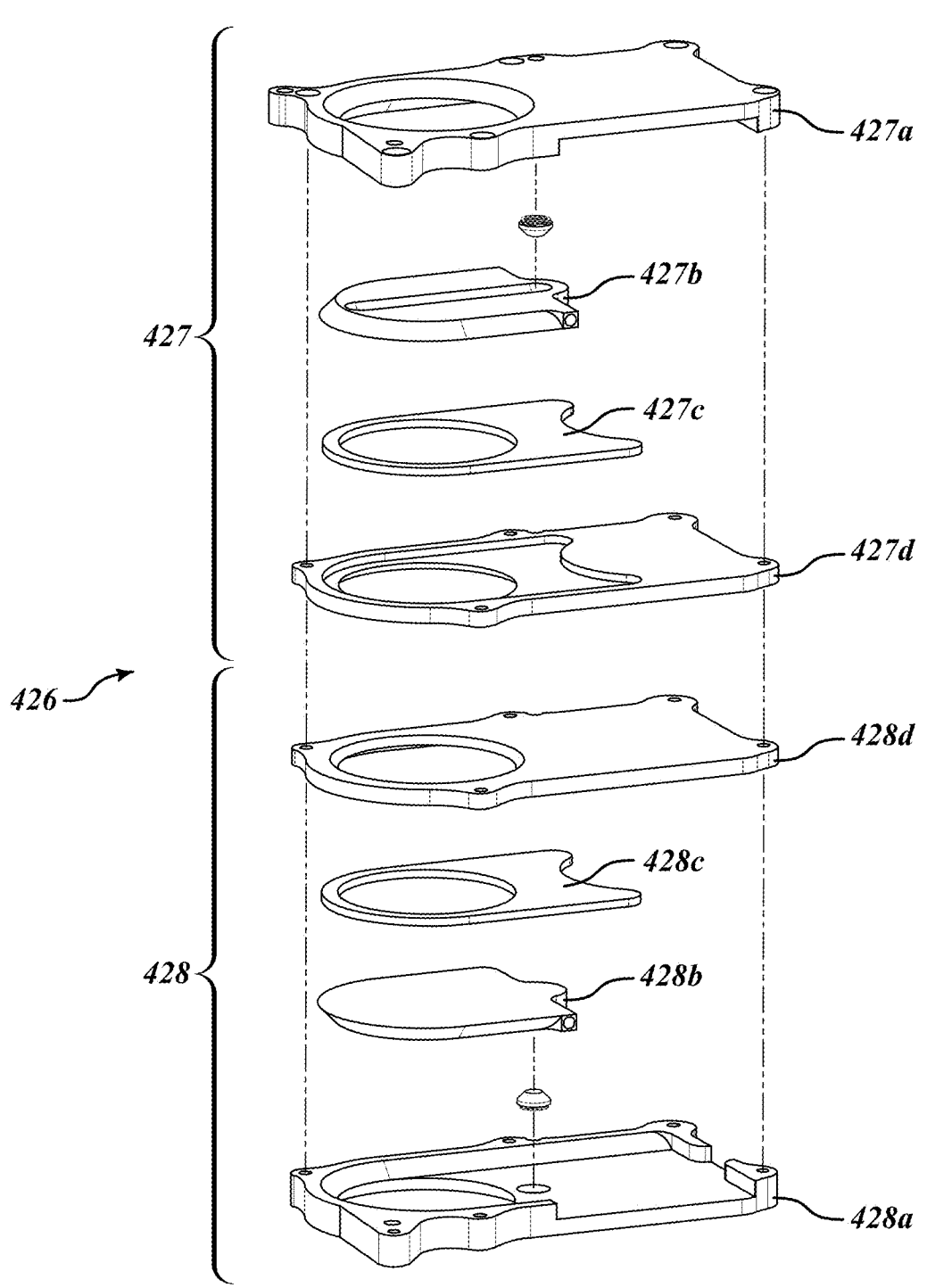
FIG. 13 is an exploded view of the door assembly of FIG. 12.

As in FIG. 13, the hopper door assembly 426 includes two door systems 427, 428. The two door systems 427, 428 have similar shapes and dimensions. Each door system 427, 428 has a respective door or plate 427b, 428b. In this embodiment, the doors 427b, 428b have a semicircular shape. One door 427a, that is a top door farther from the roasting chamber 130 than the other door, has a recessed trench.

Each door system 427, 428 includes a plurality of frame portions 427a, 427c, 427d, 428a, 428c, 428d. In this embodiment, each door system 427, 428 includes three frame portions including one intermediary frame portion 427c, 428c and two outer frame portions 427a, 427d, 428a, 428d. A respective door 427b, 428b is between the intermediary frame portion 427c, 428c and one of the outer frame portions 427a, 427d, 428a, 428d. The outer frame portions 427a, 427d, 428d, 428a have substantially similar shapes and dimensions. The outer frame portions 427a, 427d, 428d, 428a have a length in the second direction greater than a length of the door 427a, 428a.

For each door system 427, 428, one of the outer frame portions 427a, 428a has a recessed area for sliding the doors 427b, 428b. The two doors 427b, 428b are configured to open and close by sliding left and right, in the second direction, in the respective frame portion 427a, 428a.

Returning to FIG. 12, the hopper door assembly 426 includes a spring 429 for opening and closing the doors 427b, 428b. The spring 429 is attached to the doors 427b, 428b and the linear actuator 430. The two doors 427b, 428b are spaced apart in the first direction from each other via a plurality of spacers or screws.

A channel is between the hopper 420 and a roasting chamber 430. The roasting chamber 430 is as described in FIGS. 1 and 3. When in a closed configuration, the doors 427b, 428b are in the channel between the hopper 420 and the roasting chamber 430. The roasting chamber 430 includes an agitator 458 as described in FIGS. 1, 3, and 6. The roasting chamber 430 includes a roasting chamber door assembly and second linear actuator 484 as described in FIGS. 1-3 and 6.

The device 400 includes an air circulation chamber 440 as described in FIGS. 3 and 6. Below the air circulation chamber 440, and fluidically connected to the roasting chamber 430, is a recessed area 416 for securing or housing a container, as described in FIGS. 1-3. Below the recessed area 416 is a bottom frame 403 as described in FIG. 3. The bottom frame 403 has a first opening 403a in the front portion of the device 400 spaced from a second opening 403b in the rear portion of the device 400. A portion of the bottom frame 403 extending between the two openings 403a, 403b.

Coupled to a rear portion of the bottom frame 403 is a power connection port 414 as described in FIG. 3. A blower is coupled to the rear portion of the bottom frame 403 and forces air through to a connected heating assembly 486, as described in FIGS. 3 and 5.

Above the heating assembly is a waste collection system 448 as described in FIGS. 3 and 7 including a waste container 450 and a cyclone funnel 456. Fluidically connected to the waste collection system 448 is the smoke suppression system 470 as described in FIGS. 1-7. In this embodiment, the smoke suppression system 470 has a circular or cylindrical shape. Configured to secure a circular or cylindrical filter or plurality of filters.

In some embodiments, the device 100 includes an RFID scanner.

In some embodiments, the device 100 is climate controlled.

In some embodiments, the device 100 includes a digital scale. The digital scale may be a weight scale integrated with the hopper 120.

In some embodiments, the device 100 has dimensions of 7 inches wide by 12 inches deep (D6) by 16 inches tall. The width being between ends of the panel 102 in the second direction. The height being from the first cover 104 to the second cover 101. In other embodiments, the device 100 dimensions are 6 inches wide by 12 inches deep by 16 inches tall.

In some embodiments, the device 100 includes aluminum, stainless steel, glass, walnut, other suitable materials, or a combination thereof.

The device 100 allows for quick cool-down of the roasted food product.

The device 100 can be used repeatedly of roasting various batches of food product according to different or same settings. Back-to-back roasting can be carried out with the device 100. The device 100 can be run unattended by the user and can be fully automated.

The device 100 is configured to roast variable batch sizes of coffee cherry. In one embodiment, the batch sizes range from 50 g to 225 g.

The device 100 accounts for environmental characteristics and automatically adjusts roast settings or data accordingly.

A method of using the device 100 includes obtaining coffee cherry fruit or other food product for roasting. The coffee cherry fruit can be obtained from a vendor or harvested. In one embodiment, purchasing from the vender is carried out via ordering through a software application on a personal device. The user can select or choose a coffee cherry fruit according to their personal preference or flavor profile. The user may complete a quiz at any time to determine or recommend roast settings for the device 100.

After the coffee cherry has been ordered, the user receives a package containing the ordered coffee cherry. The roasting device 100 or personal device is used to scan the RFID tag on the package. The roasting properties and settings are imported, either wirelessly or otherwise from a remote server that stores the bean data, into the roasting device 100. If a personal device is used to scan the RFID tag, then the roasting data is sent to the roasting device 100 via the personal device. Roasting setting includes roasting temperature and roasting times. Roasting data or setting may include temperatures and times for roasting, five different roast levels, airflow conditions, roast durations, heating conditions, or a combination thereof.

The device 100 is operable in an offline mode.

In other embodiments, after the coffee cherry fruit has been obtained or harvested, the user sets or adjusts roast settings on the roasting device 100. Setting the roast settings is carried out via the dial and button using the display on the front of the device 100 or using the software application on the personal device that is sent to the roasting device 100.

Next, the coffee cherry fruit is placed into the device 100 via the first opening in the hopper 120. The user pushes the button or instructs the device 100 to initiate the roasting process through a personal device.

An optional step of pre-roasting or pre-heating the coffee fruit is carried out while the coffee fruit is in the hopper 120. The hopper 120 is heated to a predetermined temperature thereby heating the coffee cherry. Once the predetermined temperature is reached of the coffee cherry, the door to the roasting chamber is opened, releasing the preheated coffee cherry. The door is closed once the coffee cherry has been emptied into the roasting chamber. The coffee cherry lands on the perforated disc 138 in the roasting chamber.

External air is taken in through the gap of the device 100. The air is then pushed through the device 100 via the blower. The blower pushes the air through a first opening of the heating assembly where the air is heated to a predetermined temperature based on the roasting settings.

The heated air is then pushed through the second opening of the heating assembly to the air circulation chamber 140. From the air circulation chamber 140 the heated air is evenly distributed and pushed through the perforated disc 138 to the roasting chamber. The heat air is pushed with enough force to displace the coffee cherry off the disc 138. The coffee cherry jumps or hops in the roasting chamber so it is not over roasted or heated to high a temperature due to also being heated from the conductive disc 138.

Meanwhile, the rotatable agitator is spinning or rotating in the roasting chamber further displacing and agitating the coffee cherry. The spinning motion of the agitator constantly displaces and rotates the coffee cherry repeatedly in order to ensure an even roast amongst the coffee cherry.

During the roasting process, the sensors detect when the roasting process is complete. The sensors may detect via temperature or sound. When using sound detection, a first or a second crack is detected and used to determine when the roasting process is complete. When using temperature, once the roasted coffee beans reach a predetermined temperature based on roast settings, then the roasting process is complete. In some embodiments, a combination of both sound and temperature detection is used.

During the roasting process, air and food waste product or chaff is pushed from the roasting chamber through the vent hole. From the vent hole, the air and waste product are pushed and moved through the channel to the cyclone funnel. The food waste product, having a greater mass than air, falls through the end of the funnel into the removable waste container.

Whereas the air proceeds upwards through the smoke suppression system. The smoke suppression system filters out smoke and other particulate via the at least one filter. The filtered air then exits the device 100 via the second hole.

Once roasting is complete, the roasted food product is automatically dispensed into a container placed on the circular recessed plate 116. The second door in the roasting chamber is opened to release the roasted coffee beans through the opening to the external environment. The agitator continues rotating guiding the roasted coffee beans through the door. The roasted coffee beans then proceed down the chute and into a cup or airtight container that is in communication with the opening to receive the roasted coffee beans.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

This application claims the benefit of priority to U.S. Provisional Application No. 63/396,184, filed Aug. 8, 2022, which application is hereby incorporated by reference in its entirety.

The invention claimed is:

1. A device, comprising:
   a blower;
   a heating assembly coupled to the blower;
   an air circulation chamber coupled to the heating assembly, the air circulation chamber including a base and a central column extending transversely from the base, the central column including a drive shaft;
   a roasting chamber coupled to the air circulation chamber;
   a perforated disc coupled to the central column, the perforated disc being between the air circulation chamber and the roasting chamber, the central column extending into the roasting chamber through the perforated disc; and
   a displacement assembly in the roasting chamber and on the perforated disc, wherein the displacement assembly includes:
      a planar blade having a first portion and a second portion;
      a first arm on the first portion; and
      a second arm on the second portion, the first and second arms extending transversely from the blade.

2. The device of claim 1, wherein the roasting chamber is cylindrical having sidewalls that extend traverse to the perforated disc.

3. The device of claim 1, wherein the blade has a first end and an opposite second end, a first dimension between the first end and the second end, the first dimension being equal to or less than a diameter of the roasting chamber.

4. The device of claim 1, wherein the blade has a center coupled to the central column.

5. The device of claim 1, wherein the blade extends across a diameter of the roasting chamber.

6. The device of claim 3, wherein the first and second arms are each spaced from the center of the blade for a first dimension, and the first and second arms are each spaced from the sidewalls of the roasting chamber for a second dimension.

7. The device of claim 1, comprising a smoke suppression system including at least one filter.

8. The device of claim 1, comprising a removable waste container.

9. The device of claim 1, comprising an air intake in fluid communication with the blower, the air intake including a gap in external casing.

10. The device of claim 1, wherein the heating assembly includes a heating element in a first channel having a first end opposite a second end, the first end coupled to the blower and the second end coupled to the air circulation chamber.

11. The device of claim 1, comprising a hopper including a door between the hopper and the roasting chamber.

* * * * *